(12) United States Patent
Brill et al.

(10) Patent No.: US 7,274,971 B2
(45) Date of Patent: Sep. 25, 2007

(54) METHODS AND APPARATUS FOR ELECTRONIC DEVICE MANUFACTURING SYSTEM MONITORING AND CONTROL

(75) Inventors: Todd J. Brill, Round Rock, TX (US); Michael Teferra, Los Gatos, CA (US); Jeffrey C. Hudgens, San Francisco, CA (US); Amitabh Puri, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 315 days.

(21) Appl. No.: 11/067,303

(22) Filed: Feb. 25, 2005

(65) Prior Publication Data

US 2005/0228525 A1 Oct. 13, 2005

Related U.S. Application Data

(60) Provisional application No. 60/548,573, filed on Feb. 28, 2004.

(51) Int. Cl.
*G06F 7/00* (2006.01)

(52) U.S. Cl. .................. 700/230; 700/229; 700/112; 700/114; 700/121; 198/810.01; 198/810.02; 198/810.03; 414/935

(58) Field of Classification Search .............. 700/230, 700/213, 214, 228, 229, 112, 114, 121; 198/810.01, 198/810.02, 810.03; 414/935
See application file for complete search history.

(56) References Cited

U.S. PATENT DOCUMENTS

| 3,845,286 A | 10/1974 | Aronstein et al. |
| 3,952,388 A | 4/1976 | Hasegawa et al. |

(Continued)

FOREIGN PATENT DOCUMENTS

DE 19715974 A1 10/1998

(Continued)

OTHER PUBLICATIONS

Przewlocki, H. et al., "DIASTEMOS-computerized system of IC manufacturing control and diagnostics", 1990, Elektronika, vol. 31 No. 11-12, pp. 38-40, Polish Language. (Abstract only)

(Continued)

*Primary Examiner*—Khoi H. Tran
(74) *Attorney, Agent, or Firm*—Dugan & Dugan

(57) ABSTRACT

In a first aspect, a computer program product is provided. The computer program product includes a medium readable by a computer. The computer readable medium has computer program code adapted to (1) create a band map that indicates an expected status of one or more positions along a band of a continuously moving conveyor system, each position adapted to receive a carrier support adapted to transport at least one substrate carrier around an electronic device manufacturing facility; (2) monitor status of the one or more positions included in the continuously moving conveyor system; and (3) control operation of the continuously moving conveyor system based on the status of the one or more positions. Numerous other aspects are provided.

25 Claims, 10 Drawing Sheets

U.S. PATENT DOCUMENTS

| | | |
|---|---|---|
| 4,027,246 A | 5/1977 | Caccoma et al. |
| 4,049,123 A | 9/1977 | Fegley et al. |
| 4,166,527 A | 9/1979 | Beezer |
| 4,852,717 A * | 8/1989 | Ross et al. ............... 198/462.3 |
| 4,936,734 A | 6/1990 | Osada |
| 4,974,166 A | 11/1990 | Maney et al. |
| 5,183,378 A | 2/1993 | Asano et al. |
| 5,256,204 A | 10/1993 | Wu |
| 5,372,471 A | 12/1994 | Wu |
| 5,382,127 A | 1/1995 | Garric et al. |
| 5,388,945 A | 2/1995 | Garric et al. |
| 5,390,785 A | 2/1995 | Garric et al. |
| 5,411,358 A | 5/1995 | Garric et al. |
| 5,544,350 A | 8/1996 | Hung et al. |
| 5,562,383 A | 10/1996 | Iwai et al. |
| 5,570,990 A | 11/1996 | Bonora et al. |
| 5,612,886 A | 3/1997 | Weng |
| 5,668,056 A | 9/1997 | Wu et al. |
| 5,696,689 A | 12/1997 | Okumura et al. |
| 5,751,581 A | 5/1998 | Tau et al. |
| 5,811,211 A | 9/1998 | Tanaka et al. |
| 5,818,716 A | 10/1998 | Chin et al. |
| 5,825,650 A | 10/1998 | Wang |
| 5,884,392 A | 3/1999 | Lafond |
| 5,888,042 A | 3/1999 | Oda |
| 5,957,648 A | 9/1999 | Bachrach |
| 5,971,585 A | 10/1999 | Dangat et al. |
| 5,976,199 A | 11/1999 | Wu et al. |
| 5,980,183 A | 11/1999 | Fosnight |
| 6,009,890 A | 1/2000 | Kaneko et al. |
| 6,026,561 A | 2/2000 | Lafond |
| 6,048,259 A | 4/2000 | Asai |
| 6,050,768 A | 4/2000 | Iwasaki et al. |
| 6,053,688 A | 4/2000 | Cheng |
| 6,082,948 A | 7/2000 | Fishkin et al. |
| 6,128,588 A | 10/2000 | Chacon |
| 6,134,482 A | 10/2000 | Iwasaki |
| 6,183,186 B1 | 2/2001 | Howells et al. |
| 6,196,001 B1 | 3/2001 | Tannous et al. |
| 6,240,335 B1 | 5/2001 | Wehrung et al. |
| 6,256,550 B1 | 7/2001 | Wu et al. |
| 6,351,686 B1 | 2/2002 | Iwasaki et al. |
| 6,415,260 B1 | 7/2002 | Yang et al. |
| 6,431,814 B1 | 8/2002 | Christensen et al. |
| 6,439,822 B1 | 8/2002 | Kimura et al. |
| 6,463,350 B2 * | 10/2002 | Fukuda et al. ............... 700/121 |
| 6,526,329 B2 | 2/2003 | Tateyama et al. |
| 6,540,466 B2 | 4/2003 | Bachrach |
| 6,579,052 B1 | 6/2003 | Bonora et al. |
| 6,587,744 B1 | 7/2003 | Stoddard et al. |
| 6,641,350 B2 | 11/2003 | Nakashima et al. |
| 6,662,076 B1 | 12/2003 | Conboy et al. |
| 6,673,638 B1 | 1/2004 | Bendik et al. |
| 6,675,066 B2 * | 1/2004 | Moshgbar ............... 700/229 |
| 6,684,124 B1 | 1/2004 | Schedel et al. |
| 6,715,602 B1 * | 4/2004 | Gartland ............... 198/810.02 |
| 6,745,093 B1 | 6/2004 | Kawano et al. |
| 6,788,996 B2 | 9/2004 | Shimizu |
| 6,839,603 B2 | 1/2005 | Karasawa |
| 6,853,876 B2 * | 2/2005 | Wehrung et al. ............... 700/230 |
| 6,873,963 B1 | 3/2005 | Westbury et al. |
| 6,917,844 B2 | 7/2005 | Kawano et al. |
| 6,971,500 B2 | 12/2005 | Horn |
| 7,039,495 B1 | 5/2006 | Conboy et al. |
| 7,051,870 B2 | 5/2006 | Schoendienst et al. |
| 7,077,264 B2 * | 7/2006 | Rice et al. ............... 198/846 |
| 7,156,221 B2 * | 1/2007 | Rice et al. ............... 198/465.4 |
| 2001/0038783 A1 | 11/2001 | Nakashima et al. |
| 2001/0051837 A1 | 12/2001 | Tateyama et al. |
| 2002/0071744 A1 | 6/2002 | Bachrach |
| 2002/0081181 A1 | 6/2002 | Yokomori et al. |
| 2002/0094588 A1 | 7/2002 | Fan et al. |
| 2002/0114684 A1 | 8/2002 | Jeong et al. |
| 2002/0116086 A1 | 8/2002 | Huber et al. |
| 2002/0144654 A1 | 10/2002 | Elger |
| 2002/0155705 A1 | 10/2002 | Shimizu |
| 2002/0182040 A1 | 12/2002 | Kimura et al. |
| 2003/0108407 A1 | 6/2003 | Ogata et al. |
| 2003/0113190 A1 | 6/2003 | Bachrach |
| 2003/0202866 A1 | 10/2003 | Weng et al. |
| 2004/0049398 A1 | 3/2004 | Gartland et al. |
| 2004/0062633 A1 * | 4/2004 | Rice et al. ............... 414/935 |
| 2004/0081538 A1 * | 4/2004 | Rice et al. ............... 414/222.01 |
| 2004/0187342 A1 | 9/2004 | Izuta |
| 2004/0225393 A1 | 11/2004 | Kawano et al. |
| 2004/0262132 A1 * | 12/2004 | Pauley et al. ............... 198/810.02 |

FOREIGN PATENT DOCUMENTS

| | | |
|---|---|---|
| EP | 0 365 589 B1 | 9/1992 |
| EP | 0 663 686 A1 | 7/1995 |
| EP | 0 850 720 A1 | 7/1998 |
| EP | 1128246 A2 | 8/2001 |
| JP | 55-091839 | 7/1980 |
| JP | 58-028860 | 2/1983 |
| JP | 60-049623 | 3/1985 |
| JP | 63234511 | 9/1988 |
| JP | 01-181156 | 7/1989 |
| JP | 01-257549 | 10/1989 |
| JP | 02-015647 | 1/1990 |
| JP | 05-128131 | 5/1993 |
| JP | 05-290053 | 11/1993 |
| JP | 06132696 | 5/1994 |
| JP | 06-260545 | 9/1994 |
| JP | 08-249044 | 9/1996 |
| JP | 09-115817 | 5/1997 |
| JP | 10-135096 | 5/1998 |
| JP | 11-176717 | 7/1999 |
| JP | 11-296208 | 10/1999 |
| JP | 2000-012646 | 1/2000 |
| JP | 2001-332464 | 11/2001 |
| JP | 2003-007584 | 1/2003 |
| WO | WO 99/28952 A2 | 6/1999 |
| WO | WO 2005006408 A1 | 1/2005 |

OTHER PUBLICATIONS

Lovell, A. M. et al., "Cell automation: integrating manufacturing with robotics", Dec. 1990, Solid State Technology, vol. 33 No. 12, p. 37-9.

Prasad, K., "A generic computer simulation model to characterize photolithography manufacturing area in an IC FAB facility", Sep. 1991, IEEE Transactions on Components, Hybrids, and Manufacturing Technology, vol. 14 No. 3, p. 483-7.

Ehteshami, B. et al., "Trade-offs in cycle time management: hot lots", May 1992, IEEE Transactions on Semiconductor Manufacturing, vol. 5, No. 2, p. 101-6.

Lou, S. et al., "Using simulation to test the robustness of various existing production control policies", 1991, 1991 Winter Simulation Conference Proceedings, IEEE, p. 261-9.

Berg, R. et al., "The formula: world class manufacturing for hybrid thin-film component production", 1992, IEEE/SEMI International Semiconductor Manufacturing Science Symposium, pp. 53-60.

Naguib, H., "The implementation of total quality management in a semiconductor manufacturing operation", 1992, IEEE/SEMI International Semiconductor Manufacturing Science Symposium, p. 63-7.

Rose, D., "Productivity enhancement", 1992, IEEE/SEMI International Semiconductor Manufacturing Science Symposium, p. 68.

Narayanan, S. et al., "Object-oriented simulation to support operator decision making in semiconductor manufacturing", 1992, 1992 IEEE International Conference on Systems, Man and Cybernetics, vol. 2, p. 1510-15.

Leonovich, G. A. et al., "Integrated cost and productivity learning in CMOS semiconductor manufacturing", Jan.-Mar. 1995, IBM Journal of Research and Development, vol. 39 No. 1-2, p. 201-13.

Leonovich, G., "An approach for optimizing WIP/cycle time/output in a semiconductor fabricator", 1994, Sixteenth IEEE/CPMT International Electronics Manufacturing Technology Symposium. 'Low-Cost Manufacturing Technologies for Tomorrow's Global Economy'. Proceedings 1994 IEMT Symposium, vol. 1, p. 108-11.

Schomig, A. K. et al., "Performance modelling of pull manufacturing systems with batch servers", 1995, Proceedings 1995 INRIA/IEEE Symposium on Emrging Technologies and factory Automation. ETFA '95, vol. 3, p. 175-83.

Juba, R. C. et al., "Production improvements using a forward scheduler", 1996, Seventeenth IEEE/CPMT IEEE/CPMT International Electronics Manufacturing Technology Symposium 'Manufacturing Technologies - Present and Future', p. 205-9.

Fuller, L. F. et al., "Improving manufacturing performance at the Rochester Institute of Technology integrated circuit factory", 1995, IEEE/SEMI Advanced Semiconductor Manufacturing Conference and Workshop. Theme - Semiconductor Manufacturing: Economic Solutions for the 21st Century. ASMC '95 Proceedings, p. 350-5.

Yan, Joumin et al., "Testing the robustness of two-boundary control policies in semiconductor manufacturing", May 1996, IEEE Transactions on Semiconductor Manufacturing, vol. 19 No. 2, p. 285-8.

Lopez, M. J. et al., "Performance models of systems of multiple cluster tools", 1996, Nineteenth IEEE/CPMT International Electronics Manufacturing Technology Symposium. Proceedings 1996 IETM Symposium, pp. 57-65.

Collins, D. W. et al., "Implementation of Minimum Inventory Variability Scheduling 1-Step Ahead Policy(R) in a large semiconductor manufacturing facility", 1997, 1997 IEEE 6th International Conference on Emerging Technologies and Factory Automation Proceedings, pp. 497-504.

Labanowski, L., "Improving overall fabricator performance using the continuous improvement methodology", 1997, 1997 IEEE/SEMI Advanced Semiconductor Manufacturing Excellence: Leading the Charge into the 21st Century. ASMC Proceedings, p. 405-9.

Dudde, R. et al., "Flexible data registration and automation in semiconductor production", 1997, Proceedings of the SPIE - The International Society for Optical Engineering, p. 171-81.

Padillo, J. M. et al., "A strategic domain: IE in the semiconductor industry", Mar. 1998, IIE Solutions, pp. 36-40, 42.

Collins, D. W. et al., "Investigation of minimum inventory variability scheduling policies in a large semiconductor manufacturing facility", 1997, Proceedings of the 1997 American Control Conference, vol. 3, p. 1924-8.

Rose, O., "WIP evolution of a semiconductor factory after a bottleneck workcenter breakdown", 1998, 1998 Winter Simulation Conference. Proceedings, vol. 2, pp. 997-1003.

Iriuchijima, K. et al., "WIP allocation planning for semiconductor factories", 1998, Proceedings of the 37th IEEE Conference on Decision and Control, vol. 3, p. 2716-21.

Weiss, M., "New twists on 300 mm fab design and layout", Jul. 1999, Semiconductor International, vol. 22 No. 8, pp. 103-4, 106, 108.

Van Antwerp, K. et al., "Improving work-in-progress visibility with active product tags YASIC manufacture", Oct. 1999, Micro, vol. 17 No. 9, pp. 67-9, 72-3.

Martin, D. P., "Total operational efficiency (TOE): the determination of two capacity and cycle time components and their relationship to productivity improvements in a semiconductor manufacturing line", 1999, 10th Annual IEEE/SEMI. Advanced Semiconductor Manufacturing Conference and Workshop. ASMC 99 Proceedings, pp. 37-41.

Martin, D. P., "Capacity and cycle time-throughput understanding system (CAC-TUS) an analysis tool to determine the components of capacity and cycle time in a semiconductor manufacturing line", 1999, 10th Annual IEEE/SEMI. Advanced Semiconductor Manufacturing Conference and Workshop. ASMC 99 Proceedings, pp. 127-31.

Marcoux, P. et al., "Determining capacity loss from operational and technical deployment practices in a semiconductor manufacturing line", 1999, 1999 IEEE International Symposium on Semiconductor Manufacturing Conference Proceedings, p. 3-5.

Chen, J. C. et al., "Capacity planning for a twin fab", 1999, 1999 IEEE International Symposium on Semiconductor Manufacturing Conference Proceedings, p. 317-20.

Wei Jun-Hu et al., "Optimization methodology in simulation-based scheduling for semiconductor manufacturing", Oct. 2000, Information and Control, vol. 29 No. 5, p. 425-30, Chinese language. (Abstract only).

Hughlett, E., "Incremental levels of automation in the compound semiconductor fab", Aug. 2001, Compound Semiconductor, vol. 7 No. 7, p. 69-73.

Sarin, S. C. et al., "Reduction of average cycle time at a wafer fabrication facility", 2001, 2001 GaAs, MANTECH Conference. Digest of Papers, p. 241-6.

Saito, K. et al., "A simulation study on periodical priority dispatching of WIP for product-mix fabrication", 2002, 13th Annual IEEE/SEMI Advanced Semiconductor Manufacturing Conference. Advancing the Science and Technology of Semiconductor Manufacturing. ASMC 2002, p. 33-7.

Wang, J. et al., "The improvement of automated material handling system traffic control", 2002, 2002 Semiconductor Manufacturing Technology Workshop, p. 271-4.

Wei Jie Lee, "Optimize WIP scale through simulation approach with WIP, turn-over rate and cycle time regression analysis in semiconductor fabrication", 2002, 2002 Semiconductor Manufacturing Technology Workshop, p. 299-301.

Young Hoon Lee et al., "Push-pull production planning of the re-entrant process", 2003, International Journal of Advanced Manufacturing Technology, vol. 22 No. 11-12, p. 922-31.

Garlid, Scott C., "From philosophy to reality. Interpreting the rules of JIT for IC manufacturing", 1989, SME Technical Paper (Series) MS. Publ by SME, p. 797.

Anon, "Wafer level automation", Jan. 1995, European Semiconductor, vol. 17 No. 1, p. 2.

Anon, "The Coming of fab-wide automation", May 1998, European Semiconductor Design Production Assembly, vol. 20 No. 5, p. 21-22.

Pierce, Neal G. et al., "Dynamic disbatch and graphical monitoring system", 1999, IEEE International Symposium on Semiconductor Manufacturing Conference, Proceedings 1999, pp. 65-68.

Nagesh, Sukhi et al., "Intelligent second-generation MES solutions for 300mm fabs", 2000, Solid State Technology, vol. 43 No. 6, pp. 133-134, 136, 138.

"300mm single-wafer transport", Jul. 1999, Solid State Technology - semiconductor manufacturing and wafer fabrication, Semicon West '99 Product Spotlight, p. 5.

"300mm single-wafer handling", Apr. 2000, Solild State Technology, Product News, <www.sold-state.com>, p. 99.

Griessing, Juergen et al., "Assessing the feasibility of a 300-mm test and monitor wafer handeling and logistics system", Jul. 2000, Micro: The 300-mm Imperative, pp. 1-19.

"The Leading Company in Micro enviroment", Jan. 3, 2002, Incam Solutions Company, pp. 1-2.

"Improved wafer isolation and additional flexibility", Jan. 3, 2002, Incam Solutions Company SWIF technology, pp. 1-2.

"SEMI standards compliance" and "Related SEMI standards", Jan. 3, 2002, Incam Solutions Related standards, p. 1.

"Single Wafer Lots Solution", Jan. 3, 2002, Incam Solutions References, p. 1.

* cited by examiner

| Cradle Mounting Position ~139 | Cradle Present? (Y/N) ~141 | Cradle Positioned Properly? (Y/N) ~143 | Carrier Present? (Y/N) ~145 | # of Substrates In Carrier ~147 |
|---|---|---|---|---|
| 1 | Y | Y | Y | 2 |
| 2 | Y | Y | Y | 2 |
| 3 | Y | Y | N | N/A |
| 4 | Y | N | Y | 2 |
| 5 | N | N/A | N/A | N/A |
| ... | | | | |

FIG. 1C

METHODS AND APPARATUS FOR ELECTRONIC DEVICE MANUFACTURING SYSTEM MONITORING AND CONTROL

The present application claims priority from U.S. Provisional Patent Application Ser. No. 60/548,573, filed Feb. 28, 2004. The content of the above-identified patent application is hereby incorporated by reference herein in its entirety.

CROSS REFERENCE TO RELATED APPLICATIONS

The present application is also related to the following commonly-assigned, U.S. patent applications, each of which is hereby incorporated by reference herein in its entirety:

U.S. patent application Ser. No. 11/067,302, filed Feb. 25, 2005 and titled ""METHODS AND APPARATUS FOR ENHANCED OPERATION OF SUBSTRATE CARRIER HANDLERS""

U.S. patent application Ser. No. 11/067,311, filed Feb. 25, 2005 and titled ""METHODS AND APPARATUS FOR MATERIAL CONTROL SYSTEM INTERFACE"";

U.S. patent application Ser. No. 11/067,460, filed Feb. 25, 2005 and titled ""METHODS AND APPARATUS FOR TRANSFERRING A SUBSTRATE CARRIER WITHIN AN ELECTRONIC DEVICE MANUFACTURING FACILITY"";

U.S. patent application Ser. No. 10/650,310, filed Aug. 28, 2003 and titled ""SYSTEM FOR TRANSPORTING SUBSTRATE CARRIERS"";

U.S. patent application Ser. No. 10/764,982, filed Jan. 26, 2004 and titled ""METHODS AND APPARATUS FOR TRANSPORTING SUBSTRATE CARRIERS"";

U.S. patent application Ser. No. 10/650,480, filed Aug. 28, 2003 and titled ""SUBSTRATE CARRIER HANDLER THAT UNLOADS SUBSTRATE CARRIERS DIRECTLY FROM A MOVING CONVEYOR""; and U.S. patent application Ser. No. 10/987,955, filed Nov. 12, 2004 and titled ""BREAK-AWAY POSITIONING CONVEYOR MOUNT FOR ACCOMMODATING CONVEYOR BELT BENDS"".

FIELD OF THE INVENTION

The present invention relates generally to electronic device manufacturing, and more particularly to methods and apparatus for electronic device manufacturing system monitoring and control.

BACKGROUND

Manufacturing of electronic devices typically involves performing a sequence of procedures with respect to a substrate such as a silicon substrate, a glass plate, etc. (Such substrates may also be referred to as wafers, whether patterned or unpatterned.) These steps may include polishing, deposition, etching, photolithography, heat treatment, and so forth. Usually a number of different processing steps may be performed in a single processing system or ""tool"" which includes a plurality of processing chambers. However, it is generally the case that other processes are required to be performed at other processing locations within a fabrication facility, and it is accordingly necessary that substrates be transported within the fabrication facility from one processing location to another. Depending upon the type of electronic device to be manufactured, there may be a relatively large number of processing steps required to be performed at many different processing locations within the fabrication facility.

It is conventional to transport substrates from one processing location to another within substrate carriers such as sealed pods, cassettes, containers and so forth. It is also conventional to employ automated substrate carrier transport devices, such as automatic guided vehicles, overhead transport systems, substrate carrier handling robots, etc., to move substrate carriers from location to location within the fabrication facility or to transfer substrate carriers from or to a substrate carrier transport device.

For an individual substrate, the total fabrication process, from formation or receipt of the virgin substrate to cutting of semiconductor devices from the finished substrate, may require an elapsed time that is measured in weeks or months. In a typical fabrication facility, a large number of substrates may accordingly be present at any given time as ""work in progress"" (WIP). The substrates present in the fabrication facility as WIP may represent a very large investment of working capital, which tends to increase the per substrate manufacturing cost. It may therefore be desirable to reduce the amount of WIP for a given substrate throughput for the fabrication facility. To do so, the total elapsed time for processing each substrate should be reduced.

SUMMARY OF THE INVENTION

In a first aspect of the invention, a computer program product is provided. The computer program product includes a medium readable by a computer. The computer readable medium has computer program code adapted to (1) create a band map that indicates an expected status of one or more positions along a band of a continuously moving conveyor system, each position adapted to receive a carrier support adapted to transport at least one substrate carrier around an electronic device manufacturing facility; (2) monitor a status of the one or more positions included in the continuously moving conveyor system; and (3) control operation of the continuously moving conveyor system based on the status the one or more positions. Each computer program product described herein may be carried by a medium readable by a computer (e.g., a carrier wave signal, a floppy disc, a compact disc, a DVD, a hard drive, a random access memory, etc.).

In a second aspect of the invention, a method is provided for electronic device manufacturing. The method includes the steps of (1) creating a band map that indicates an expected status of one or more positions along a band of a continuously moving conveyor system, each position adapted to receive a carrier support adapted to transport at least one substrate carrier around an electronic device manufacturing facility; (2) monitoring a status of the one or more positions included in the continuously moving conveyor system; and (3) controlling operation of the continuously moving conveyor system based on the status the one or more positions.

In a third aspect of the invention, a system is provided for electronic device manufacturing. The system includes (1) a continuously moving conveyor system, including a band having one or more positions adapted to receive a respective carrier support adapted to support a carrier and transport the substrate carrier around an electronic device manufacturing facility; (2) at least one processing tool; and (3) a control system, coupled to the continuously moving conveyor system and the at least one processing tool. The control system is adapted to (a) create a band map that indicates an expected status of the one or more positions adapted to receive a carrier support along the band; (b) monitor a status of the one or more positions included in the continuously moving conveyor system; and (c) control operation of the continuously moving conveyor system based on the status the one or more positions. Numerous other aspects are provided in accordance with these and other aspects of the invention.

Other features and aspects of the present invention will become more fully apparent from the following detailed description, the appended claims and the accompanying drawings.

BRIEF DESCRIPTION OF THE FIGURES

FIG. 1C is a block diagram of an example of a band map used by the continuously moving conveyor system in accordance with an embodiment of the present invention.

DETAILED DESCRIPTION

Figure 1A:
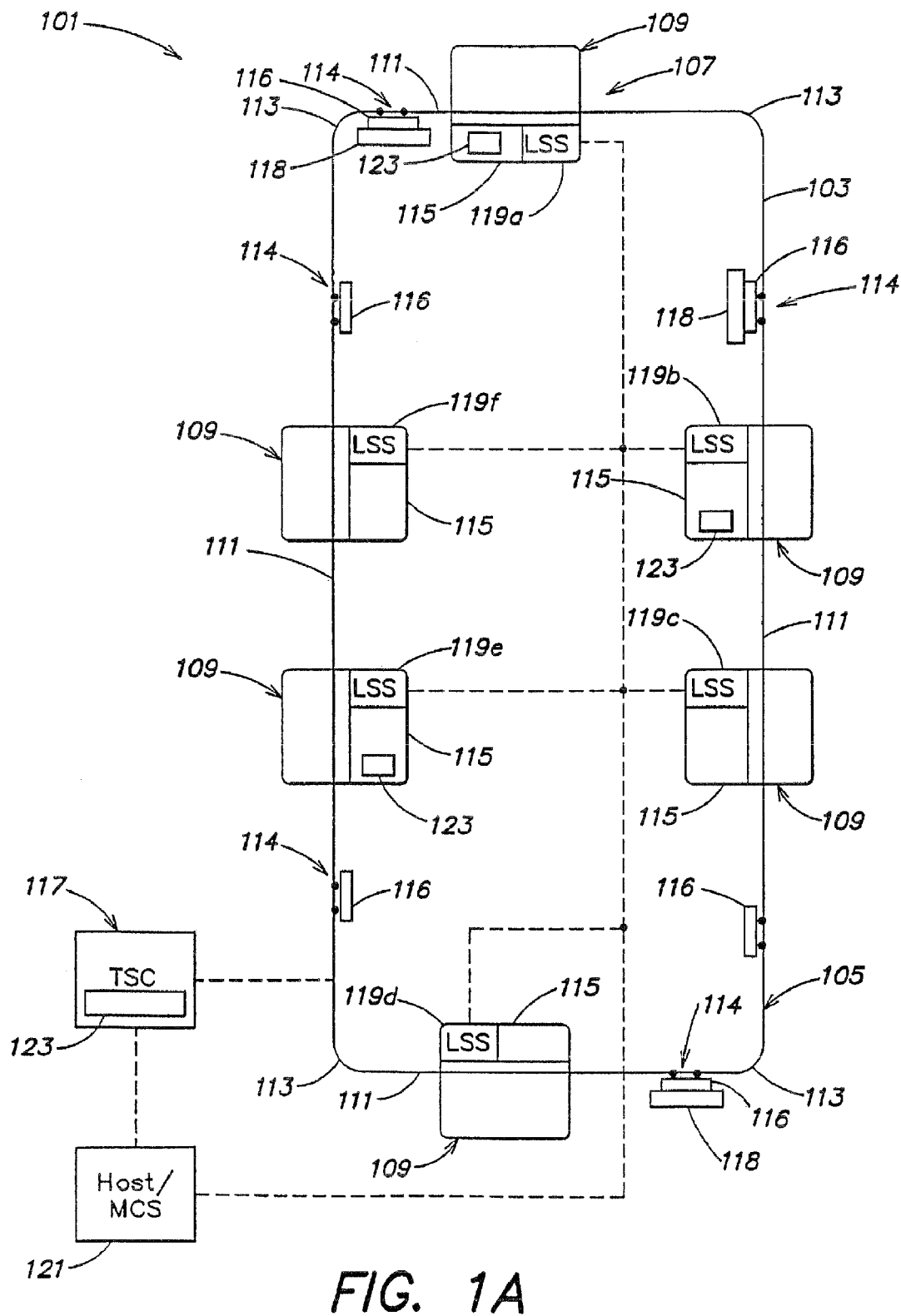
FIG. 1A is a schematic top view of an exemplary continuously moving conveyor system comprising a band (or ribbon) that forms a simple loop within a portion of an electronic device manufacturing facility in accordance with an embodiment of the present invention.

The present invention provides methods and apparatus for monitoring a continuously moving conveyor system adapted to transfer a substrate carrier between processing tools in an electronic device fabrication facility. The conveyor system may include a band with one or more positions (e.g., carrier support mounting positions) that may receive a carrier support (e.g., a cradle). In this manner, the carrier support may be coupled to the band and employed to support and transport a substrate carrier ("carrier") as the band moves through an electronic (e.g., a semiconductor) device manufacturing facility. The features of the present invention are particularly advantageous with the use of single or small lot size substrate carriers. As used herein, the term "small lot size" substrate carrier or "small lot" carrier may refer to a carrier that is adapted to hold fewer substrates than a conventional "large lot size" carrier which typically holds thirteen or twenty-five substrates. As an example, a small lot size carrier may be adapted to hold five or less substrates. In some embodiments, other small lot size carriers may be employed (e.g., small lot size carriers that hold one, two, three, four or more than five substrates, but less than that of a large lot size carrier). In general, each small lot size carrier may hold too few substrates for human transport of carriers to be viable within an electronic device or other manufacturing facility.

According to the present methods and apparatus, the continuously moving conveyor system may include a control system adapted to monitor a status of the one or more positions and may compare an actual status with an expected status of the one or more positions. The actual status may represent recently observed or sensed information while the expected status may represent stored information retrieved from a database (e.g., a band map). In one embodiment, the control system may include a transport system controller (TSC) and a host/material control system (MCS) to which the TSC may interface other control configurations may be employed.

The actual status may include information such as whether a carrier support is present in a position, and if so, whether the carrier support is positioned properly. Further, the actual status may include information about whether the carrier support is supporting a carrier. Similarly, the expected status may include information such as whether a carrier support is expected to be in a position, and if so, whether the carrier support is expected to be properly positioned and/or whether the carrier support is expected to be supporting a carrier. The expected status of the positions may be recorded and stored in a database that may be referred to as a band map. A difference between the expected status for a position and the actual status for the position may indicate an occurrence of an anomaly to which the control system may respond as described below.

Additionally or alternatively, the control system may monitor the status of the band itself. More specifically, the control system may monitor the structural integrity of the band. Further, the control system may detect obstructions which may affect the transfer of a carrier between a processing tool and the band of the continuously moving conveyor system.

Based on the above monitoring, the control system may control operation of the continuously moving conveyor system such that electronic device manufacturing is improved. For example, in response to an occurrence of an anomaly, the control system may prevent a position on the band from being assigned for transferring a carrier, stop movement of the band, determine a location of a predetermined starting position of the band and thereafter create a new band map that may indicate an expected status of the one or more positions, abort a transfer at a processing tool, assign a position for transferring a carrier, etc. In this manner, the control system may reduce and/or eliminate system downtime and/or increase system throughput.

Previously incorporated U.S. patent application Ser. No. 10/650,310, filed Aug. 28, 2003 and titled "System For Transporting Substrate Carriers", discloses a substrate carrier transport system or similar delivery system that includes a conveyor for substrate carriers that is intended to be constantly in motion during operation of the fabrication facility which it serves. The constantly moving conveyor may be employed to reduce the total "dwell" time of each substrate in the fabrication facility.

To operate a fabrication facility in this manner, methods and apparatus may be provided for unloading substrate carriers from the conveyor, and for loading substrate carriers onto the conveyor, while the conveyor is in motion. Previously incorporated U.S. patent application Ser. No. 10/650, 480, filed Aug. 28, 2003 and titled "Substrate Carrier Handler That Unloads Substrate Carriers Directly From a Moving Conveyor", discloses a substrate carrier handler at a substrate loading station or "tool station" that may perform such loading/unloading operations with respect to a moving conveyor. For example, a substrate loading station or tool station may include a horizontal guide that is moveable vertically, and an end effector that is moveable horizontally along the horizontal guide. Other configurations for moving the end effector vertically and/or horizontally are provided.

To unload a substrate carrier from a moving conveyor that transfers substrate carriers (a "substrate carrier conveyor") and that passes by the substrate loading station, the end effector is moved horizontally at a velocity that substantially matches the velocity of the substrate carrier as it is being transported by the substrate carrier conveyor (e.g., by substantially matching substrate carrier speed in a horizontal direction). In addition, the end effector may be maintained in a position adjacent the substrate carrier as the substrate carrier is being transported. The end effector thus may substantially match a position of the substrate carrier while substantially matching a velocity of the substrate carrier. Likewise, conveyor position and/or velocity may be substantially matched.

While the end effector substantially matches the substrate carrier's velocity (and/or position), the end effector is raised so that the end effector contacts the substrate carrier and disengages the substrate carrier from the substrate carrier conveyor. A substrate carrier similarly may be loaded onto the moving substrate carrier conveyor by substantially matching end effector and conveyor velocities (and/or positions) during loading. In at least one embodiment, such substrate carrier handoffs between the end effector and substrate carrier conveyor are performed at a substantially zero relative velocity and/or acceleration between the end effector and the substrate carrier.

Previously incorporated U.S. patent application Ser. No. 10/764,982, filed Jan. 26, 2004 and titled "Methods and Apparatus for Transporting Substrate Carriers", describes a conveyor system that may be employed with the above-described substrate carrier transport system and/or substrate loading station for transporting substrate carriers between one or more processing tools of an electronic device manufacturing facility. The conveyor system may include a ribbon (or "band") that forms a closed loop within at least a portion of the electronic device manufacturing facility and that transports substrate carriers therein. In one or more embodiments, the ribbon or band may be formed from stainless steel, polycarbonate, composite materials (e.g., carbon graphite, fiberglass, etc.), steel or otherwise reinforced polyurethane, epoxy laminates, plastic or polymer materials that include stainless steel, fabric (e.g., carbon fiber, fiberglass, Kevlar® available from Dupont, polyethelene, steel mesh, etc.) or another stiffening material, etc. By orienting the ribbon so that a thick portion of the ribbon resides within a vertical plane and a thin portion of the ribbon resides within a horizontal plane, the ribbon is flexible in the horizontal plane and rigid in the vertical plane. Such a configuration allows the conveyor to be constructed and implemented inexpensively. For example, the ribbon requires little material to construct, is easy to fabricate and, due to its vertical rigidity/strength, can support the weight of numerous substrate carriers without supplemental support structure (such as rollers or other similar mechanisms used in conventional, horizontally-oriented belt-type conveyor systems). Furthermore, the conveyor system is highly customizable because the ribbon may be bent, bowed or otherwise shaped into numerous configurations due to its lateral flexibility.

FIG. 1A is a schematic top view of an exemplary conveyor system 101 comprising a band (or ribbon) 103 that forms a simple loop 105 within a portion of an electronic (e.g., semiconductor) device manufacturing facility 107 in accordance with an embodiment of the present invention. The ribbon 103 may comprise, for example, one of the ribbons described in U.S. patent application Ser. No. 10/764, 982, filed Jan. 26, 2004 and titled "Methods and Apparatus for Transporting Substrate Carriers". The ribbon 103 transports carriers (not shown) between processing tools 109, and comprises straight portions 111 and curved portions 113 to form the (closed) loop 105. Other numbers of processing tools 109 and/or loop configurations may be employed. In some embodiments, the ribbon 103 may include holes, slits or the like adapted for use with sensors to identify carrier support mounting positions 114.

Each processing tool 109 may include a carrier handler at a substrate loading station or "tool station" 115 of the processing tool 109 for unloading a carrier from or for loading a carrier onto the moving ribbon 103 of the conveyor system 101 as the ribbon 103 passes by the substrate loading station 115 (as described in U.S. patent application Ser. No. 10/650,480, filed Aug. 28, 2003 and titled "Substrate Carrier Handler That Unloads Substrate Carriers Directly From a Moving Conveyor". For example, an end effector (not separately shown) of a substrate loading station 115 may be moved horizontally at a velocity that substantially matches the velocity of the carrier as it is being transported by the ribbon 103, maintained in a position adjacent the carrier as the carrier is being transported and raised so that the end effector contacts the carrier and disengages the carrier from the conveyor system 101.

A carrier similarly may be loaded onto the moving ribbon 103 by substantially matching end effector and ribbon velocities (and/or positions) during loading. More specifically, the ribbon or band 103 of the continuously moving conveyor system 101 may include one or more positions adapted to receive a carrier support (not shown) for supporting a carrier (not shown) and transporting the carrier about an electronic device manufacturing facility. The carrier support may support the carrier and transport the carrier above processing tools 109 of the electronic device manufacturing facility. In the manner described above, the substrate loading station 115 of each processing tool 109 is adapted to transfer a substrate carrier between the ribbon or band 103 and the processing tool 109. In some embodiments, carriers and carrier supports may include holes, slits or the like, and/or light-blocking devices that may be used in conjunction with sensors to determine the presence, absence, and/or positioning of carrier supports and/or carriers at a given position.

Each substrate loading station 115 may include one or more load ports or similar locations where substrate carriers are placed for substrate transfer to and/or from a processing tool (e.g., one or more docking stations, although transfer locations that do not employ docking/undocking movement may be employed). Various carrier storage locations also may be provided at each substrate loading station 115 for carrier buffering at a processing tool 109.

The conveyor system 101 includes a transport system controller (TSC) 117 adapted to control operation of the band 103. For example the TSC 117 may control/monitor the speed and/or status of the band 103, allocate carrier supports of the band that are used to support/transport substrate carriers, monitor status of the carrier supports, provide such information to each substrate loading station 115 or the like. Likewise, each substrate loading station 115 may include substrate loading station software (LSS) 119a-f for controlling substrate loading station operation (e.g., loading or unloading of substrate carriers to/from the conveyor system 101, transporting of substrate carriers to/from load ports or storage locations of the substrate loading station 115 and/or processing tool 109 serviced by the substrate loading station, etc.). For example, the LSS 119a-f may operate with a tool controller (e.g., an intercept controller not shown). A host/ material control system (MCS) 121 communicates with the transport system controller 117 and the substrate loading station software 119a-f of each substrate loading station 115 for affecting operation of the same. The TSC 117, each LSS 119a-f and/or the MCS 121 may include a scheduler (not shown) for controlling scheduling of the operations performed by the respective TSC 117, LSS 119*a-f* and/or the MCS 121. In some embodiments, the TSC 117 and/or the substrate loading stations 115 may include sensing systems 123, such as a vision system (e.g., a digital camera, charge-coupled device array, etc.) or other types of sensors, adapted to acquire information about the conveyor system 101. For example, the sensing system 123 may include one or more pairs of a light source and a photodetector adapted to detect the light source. The light source and corresponding photodetector may be placed on opposite sides of the band 103 such that, unless obstructed by a carrier support coupled to a carrier support mounting position on the band 103, the light source provides a continuous beam of light to the photodetector. In this manner, if the beam of light is not obstructed when expected, the sensing system 123 may detect a dislodged carrier support or similar problem.

Alternatively or additionally, the sensing system 123 may detect any defects or structural problems with the band 103. For example, the sensing system 123 may include a stress sensor adapted to transmit a signal (e.g., wirelessly) to a corresponding receiver. More specifically, the stress sensor may be attached to the band 103. When the band 103 is stretched and/or fatigued beyond a predetermined threshold, the stress sensor may transmit to the receiver a signal indicating such occurrence. For example, the stress sensor may include conductors longitudinally attached to a length of the band 103 such that, as the band 103 stretches, the conductors break and can no longer conduct current. Once the stress sensor determines a conductor has failed, the wireless transmitter may emit the signal to the TSC 117 and/or sensing system 123.

The above system is especially well suited for transferring small lot size substrate carriers, such as substrate carriers that hold a single substrate or substantially fewer than 25 substrates. As used herein, the term substrate may include a glass substrate, a polymer substrate, a semiconductor wafer, masks, reticules, and the like.

Figure 1B:
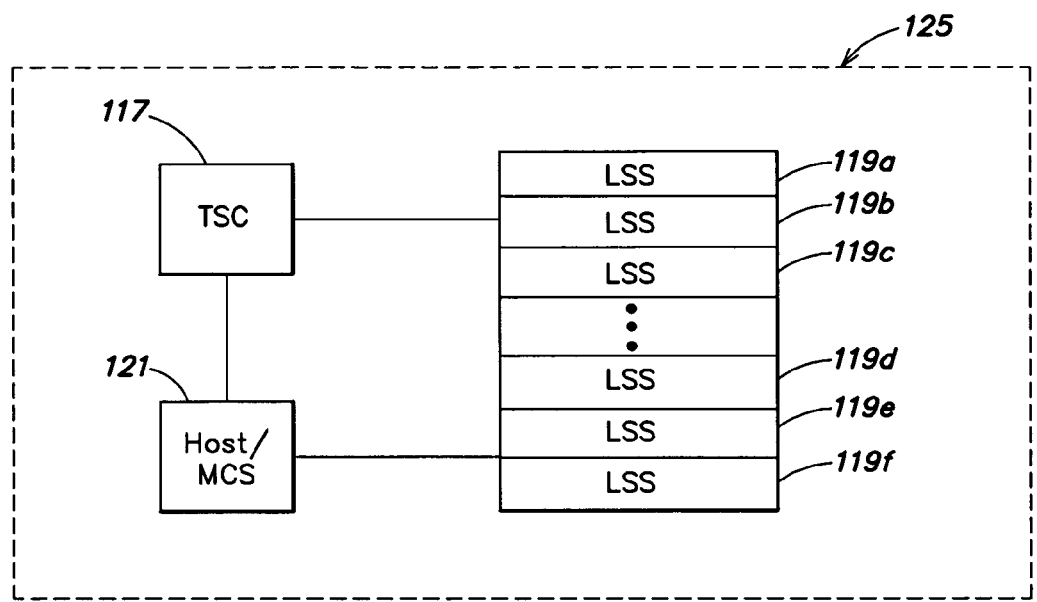
FIG. 1B is a block diagram of a control system included in the exemplary continuously moving conveyor system in accordance with an embodiment of the present invention.

FIG. 1B is a block diagram of a control system included in the exemplary continuously moving conveyor system in accordance with an embodiment of the present invention. With reference to FIG. 1B, the substrate loading station software (LSS) 119*a-f* corresponding to each processing tool, the Tool System Controller (TSC) 117 and Material Control System (MCS) 121 may form a control system 125 adapted to control operation of the continuously moving conveyor system 101. Details of how the control system 125 operates, and more specifically, how the TSC 117 and/or MCS 121 monitor the conveyor system 101 (e.g., by comparing expected and actual carrier support mounting position statuses) and control operation of the band (or ribbon) 103 based thereon are described below with reference to FIGS. 2-8.

The control system 125 may employ a band map to control operation of the band. FIG. 1C is a block diagram of an example of a band map used by the continuously moving conveyor system 101 in accordance with an embodiment of the present invention. With reference to FIG. 1C, the band map 126 may be a database 127 storing an expected status of one or more carrier support mounting positions on the band 103. For example, the database 127 may include a row 129-137 corresponding to each carrier support mounting position on the band 103. The database 127 may include a first column 139 uniquely identifying the carrier support mounting position, a second column 141 indicating whether a carrier support is present in the carrier support mounting position 139 and a third column 143 indicating whether the carrier support (if present in the carrier support mounting position) is properly positioned. Additionally, the database 127 may include a fourth column 145 indicating whether a carrier is present in the carrier support (if a carrier support is present in the carrier support mounting position). Further, the database may include a fifth column 147 indicating a number of substrates stored in a carrier (if a carrier is present in a carrier support corresponding to a carrier support mounting position. For example, in this manner, the band map 126 may indicate an improperly-positioned carrier support is expected to be present in carrier support mounting position "4". Further, the band map 126 may indicate a carrier, which stores "2" substrates, is expected to be present in the carrier support. Although the database 127 configuration includes five rows 129-137 and five columns 139-147, the database 127 may include a larger or smaller number of rows and/or columns. In this manner, the database 127 may store a larger or smaller amount of data. Further, the structure of the database 127 (e.g., arrangement of data in rows and columns) described above is exemplary. The database 127 may be structured in a different manner. For example, the database 127 may be a relational database, flat-file database, object database, distributed database, or the like. Further, the description of data populating the database 127 is exemplary, and therefore, the database 127 may include different data. In some embodiments, the database 127 may be part of a larger database maintained by the MCS 121 and used to track substrates as they are processed in the electronic device fabrication facility.

Figure 2:
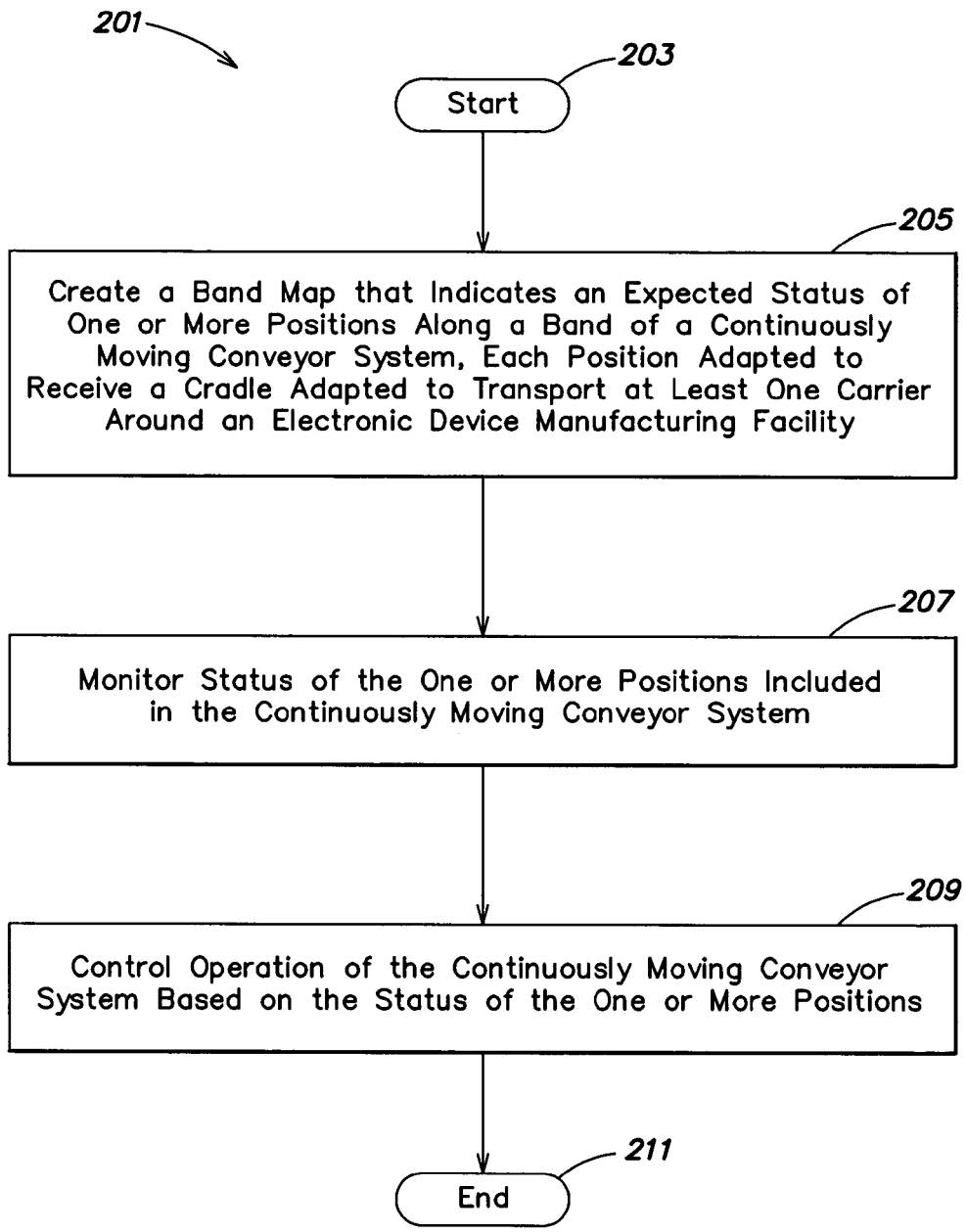
FIG. 2 illustrates a first exemplary method of electronic device manufacturing in accordance with an embodiment of the present invention.
Figure 3:
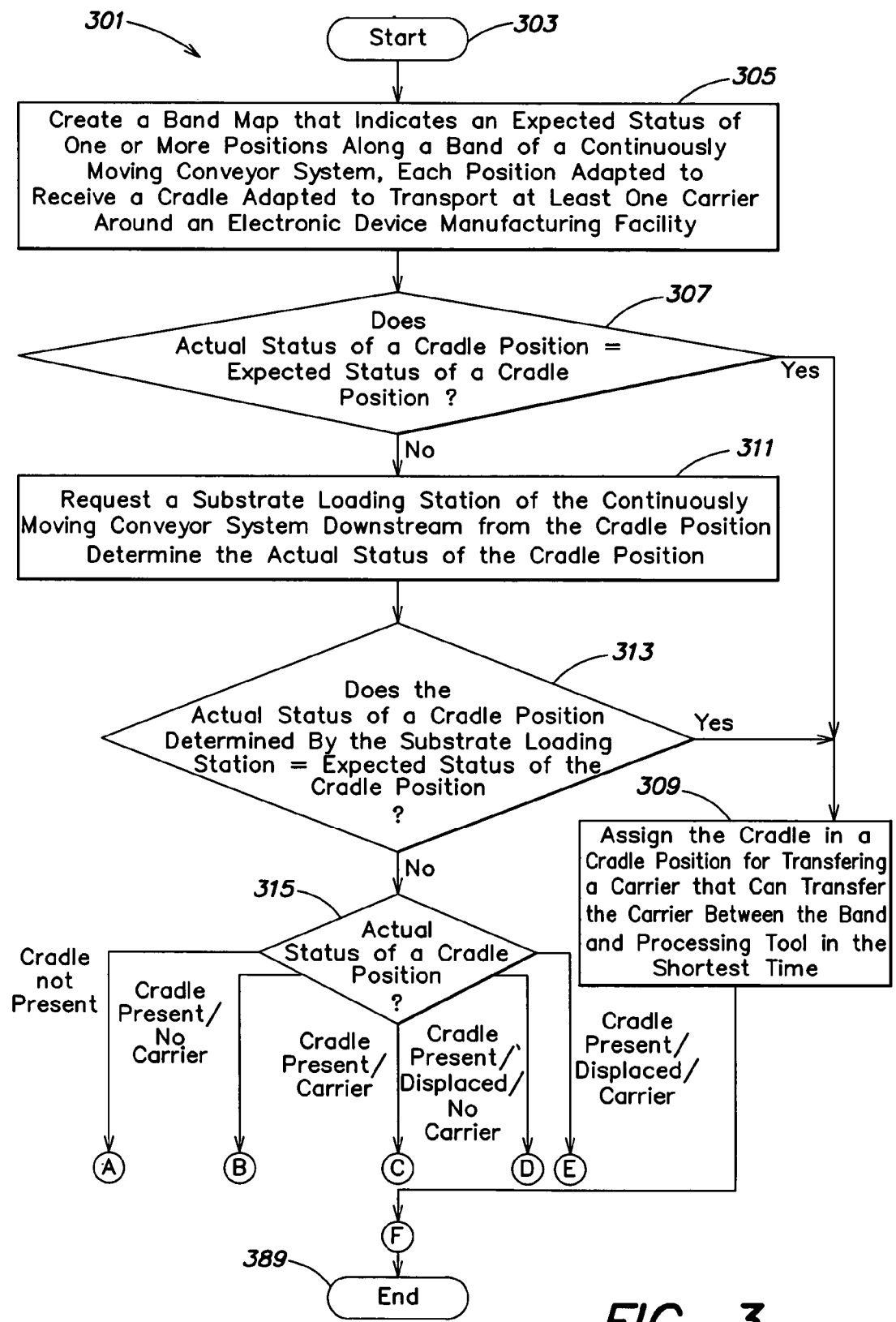
FIGS. 3-8 illustrate a second exemplary method of electronic device manufacturing in accordance with an embodiment of the present invention.
Figure 4:
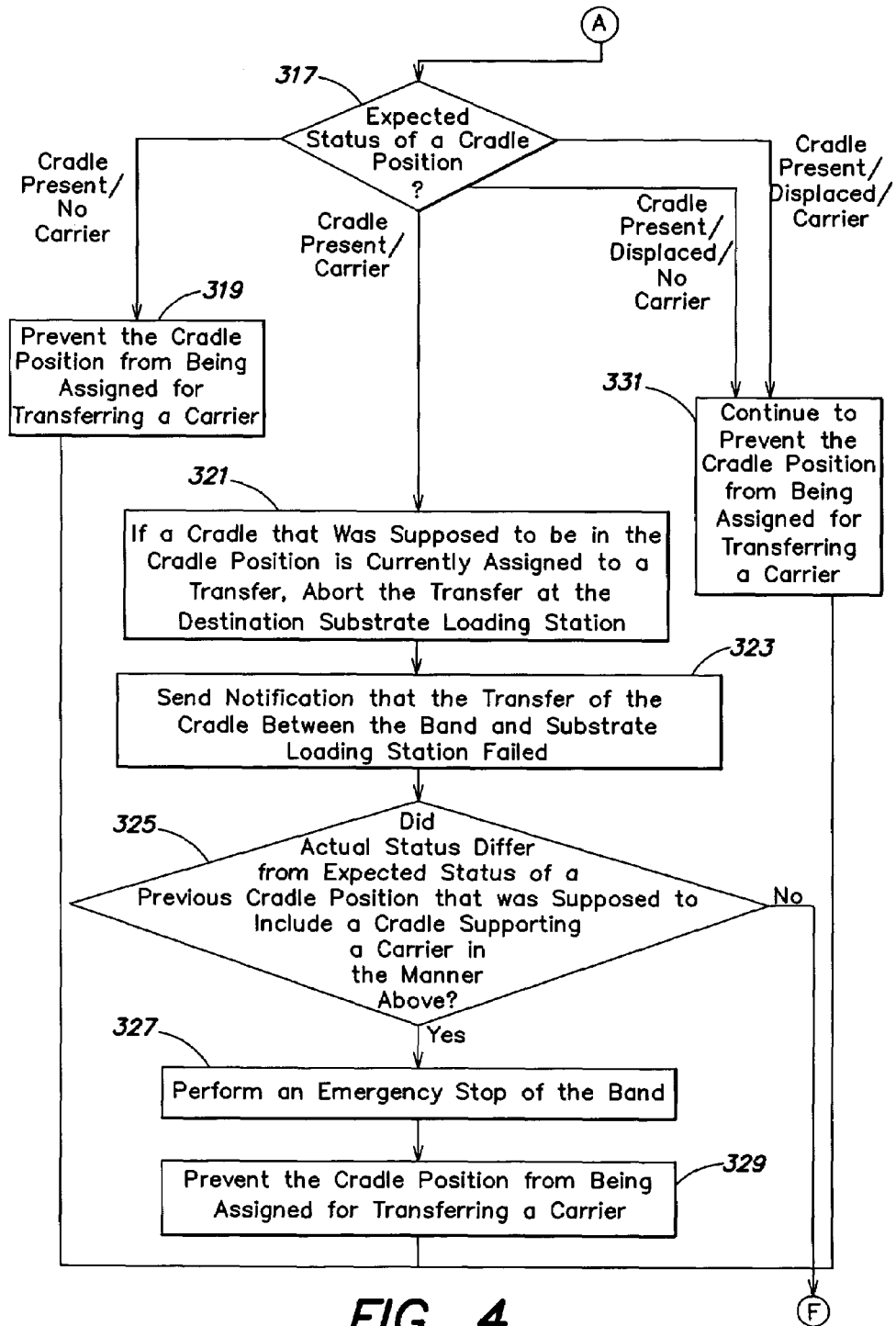
Figure 5:
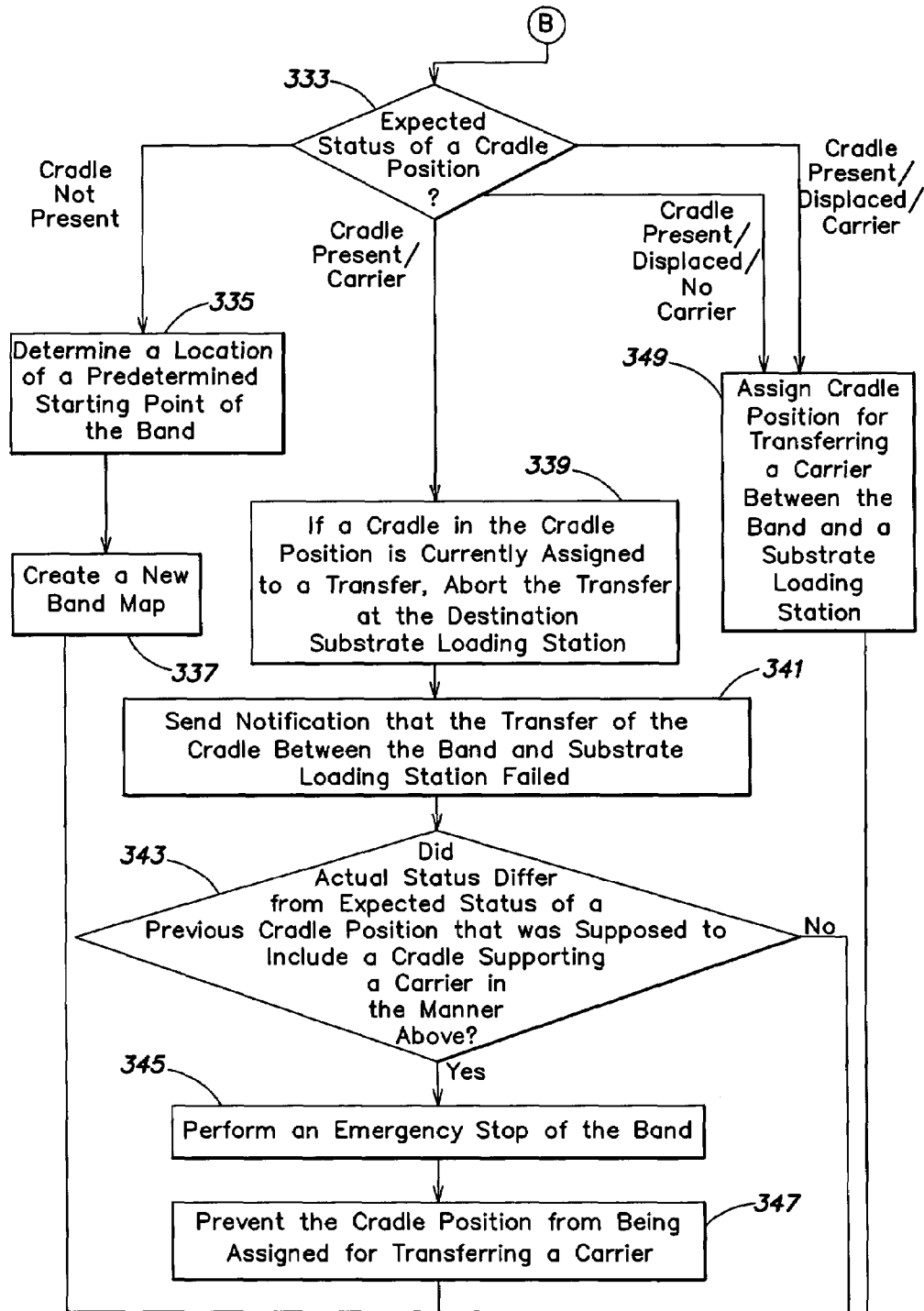
Figure 6:
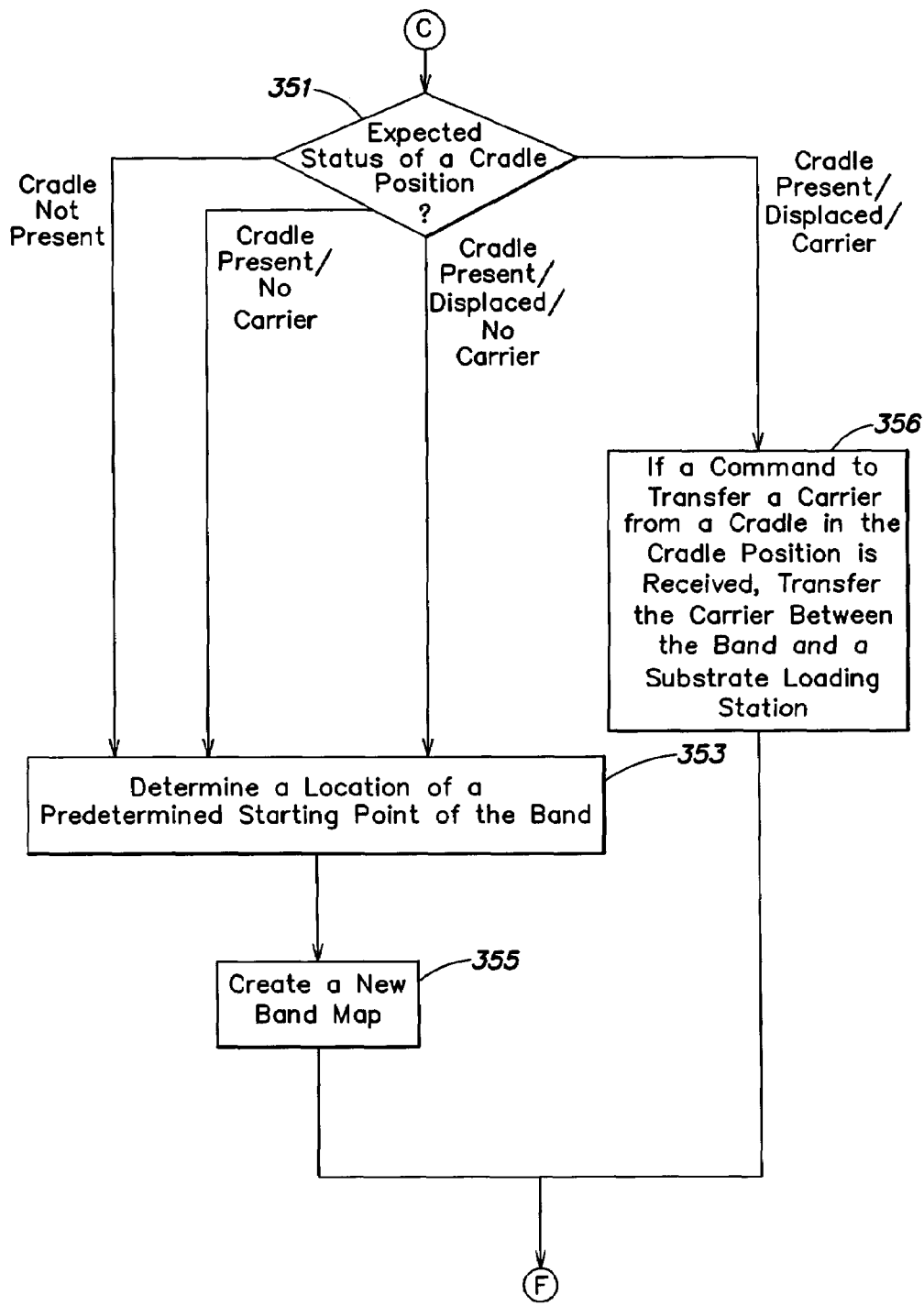
Figure 7:
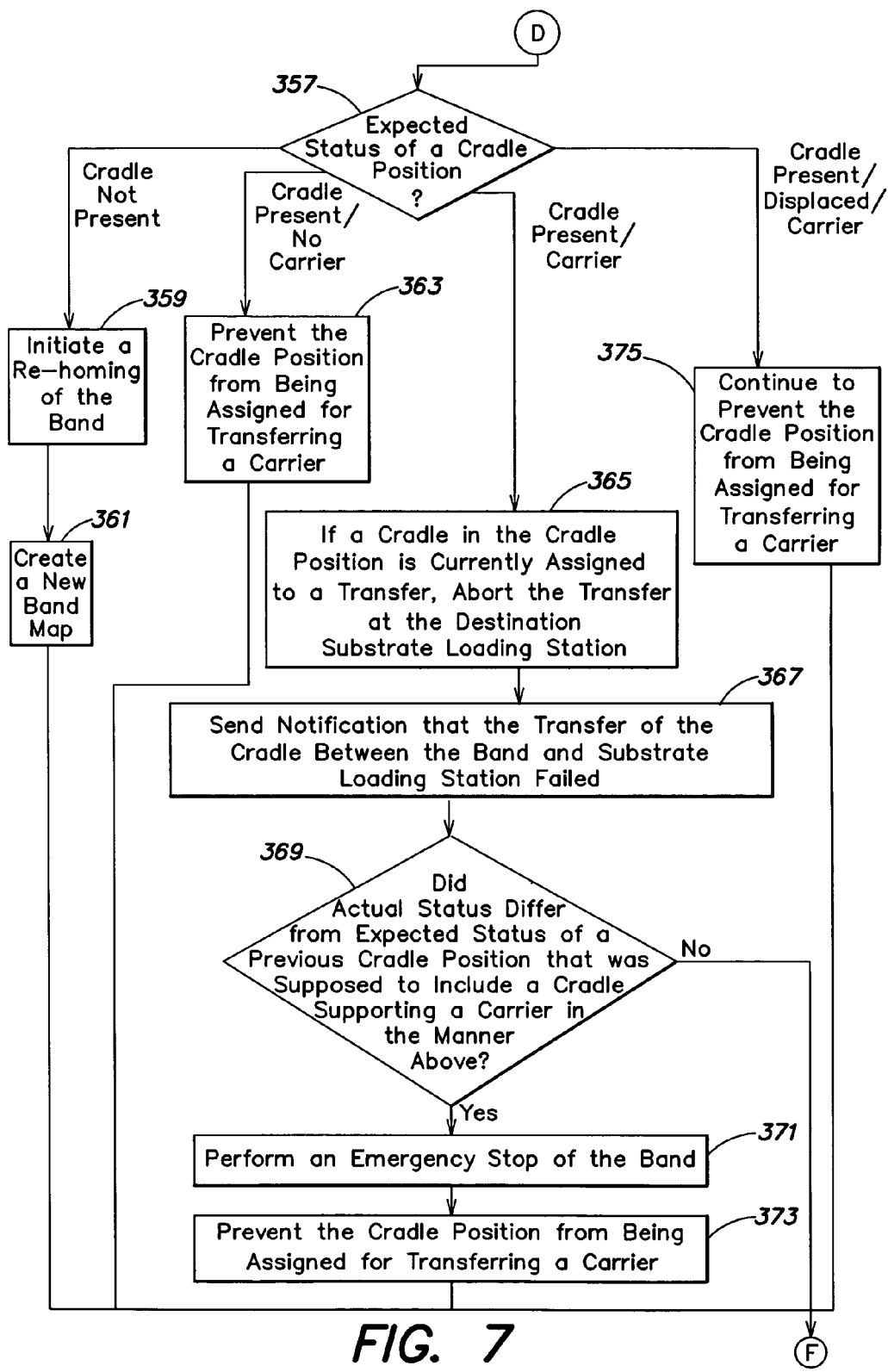
Figure 8:
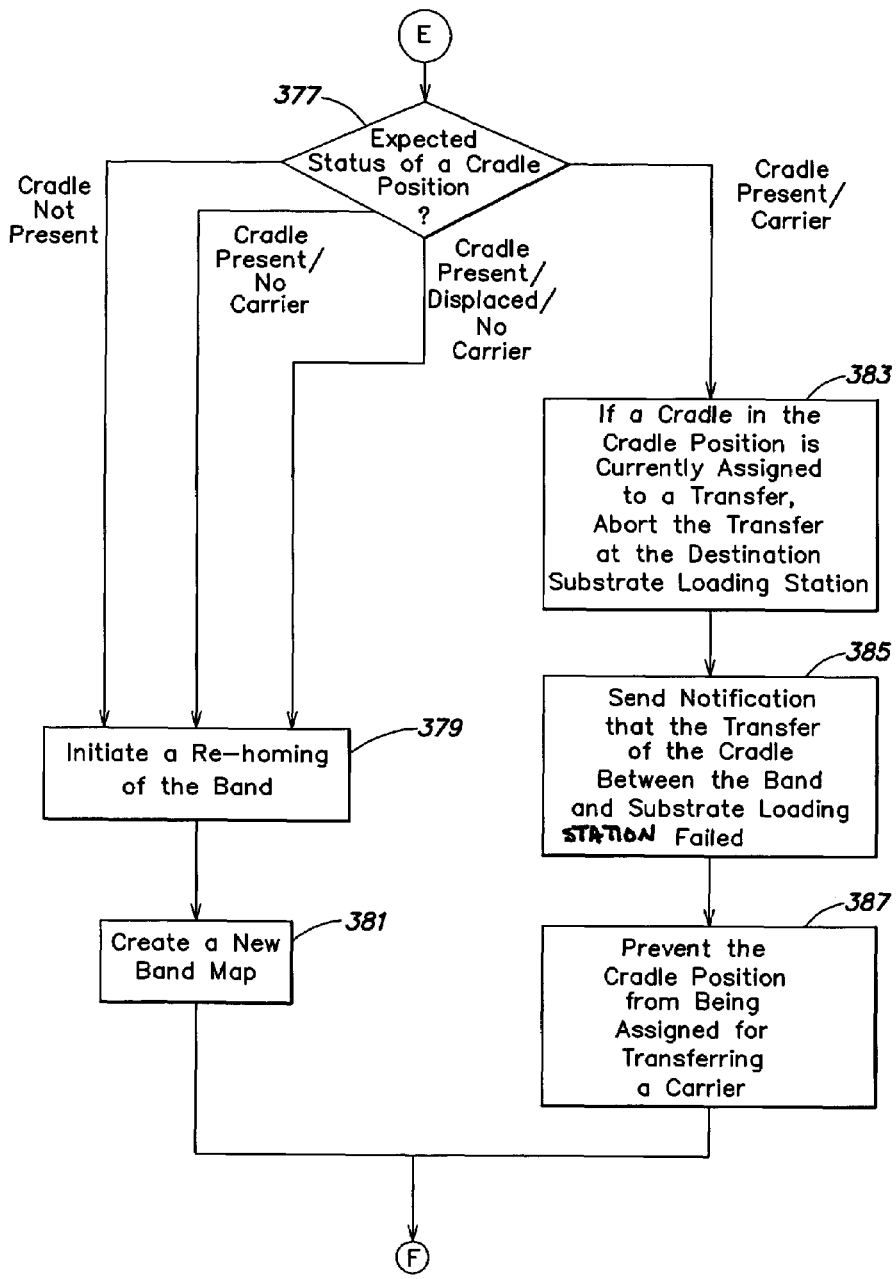

FIG. 2 illustrates a first exemplary method of electronic device manufacturing in accordance with an embodiment of the present invention. With reference to FIG. 2, in step 203, the method 201 begins. In step 205, a band map is created that indicates an expected status of one or more (e.g., all) positions along a band of a continuously moving conveyor system. Each of the one or more positions along the band is adapted to receive a carrier support adapted to transport at least one substrate carrier around an electronic device manufacturing facility. For example, during an initialization period, the control system 125, and more specifically, the TSC 117 may create the band map indicating a status of one or more positions along the band of the continuously moving conveyor system during that time period. Such status of the one or more positions along the band during the initialization period may be stored and serve as an expected status of the one or more positions.

The expected status of each of the one or more positions may include (1) a carrier support is not present in the position; (2) a properly-positioned carrier support, which is not supporting a substrate carrier, is present in the position; (3) a properly-positioned carrier support, which is supporting a substrate carrier, is present in the position; (4) an improperly-positioned (e.g., displaced) carrier support, which is not supporting a substrate carrier, is present in the position; and (5) an improperly-positioned carrier support, which is supporting a substrate carrier, is present in the position. Although five exemplary expected statuses of a position are listed above, in some embodiments, a larger or smaller number of expected statuses may be employed. For example, the presence and number of substrates within a carrier may be tracked. Alternatively, different expected statuses may be employed. For an expected status in which a carrier support, which is supporting a substrate carrier, is present in the position (e.g., expected statuses (3) and (5)), the expected status may also include an identification of the substrate carrier supported by the carrier support. The control system 125 of the continuously moving conveyor system 101 may employ the band map to control operation of the continuously moving conveyor system 101 during electronic device manufacturing.

In step 207, status of the one or more positions included in the continuously moving conveyor system is monitored. For example, during a time period of electronic device manufacturing subsequent to the initialization period, the control system 125, and more specifically, the TSC 117 may determine the status (e.g., actual status) of the one or more positions. The actual status of each of the one or more positions during electronic device manufacturing may be similar to the expected status of such positions described above.

In step 209, the operation of the continuously moving conveyor system is controlled based on the status of the one or more positions. During a time period of electronic device manufacturing subsequent to the initialization period, the control system 125 may control operation of the continuously moving conveyor system 101 such that electronic device manufacturing is improved (e.g., compared to conventional electronic device manufacturing systems). For example, the control system 125 may reduce and/or eliminate system downtime and/or increase system throughput.

More specifically, the control system 125 may compare (e.g., continually) the actual status of one or more of the positions with a corresponding expected status of such positions during the subsequent time period. Based on the above comparison, the control system 125 may determine an occurrence of an anomaly (e.g., if the actual and expected statuses do not match), which may require maintenance and/or user intervention to correct. Therefore, the MCS 121 may communicate with the TSC 117 and/or one or more of the substrate loading stations (e.g., LSS 119a-f included in the substrate loading stations) to control operation of the continuously moving conveyor system. For example, the MCS 121 may communicate with the TSC 117 and/or one or more of the substrate loading stations 115 (e.g., LSS 119a-f included in the substrate loading stations), each of which may simultaneously monitor respective portions of the conveyor system, to prevent a position from being assigned for transferring a carrier, abort a transfer at one of the processing tools, stop moving the band 103, determine a location of a predetermined starting point of the band 103 and create a new band map, assign a position for transferring a carrier between the band 103 and one of the processing tools and/or transfer a carrier between the band 103 and one of the processing tools. Although several exemplary control system actions are described above, in some embodiments, a larger or smaller number of control system actions may be employed. Further, different control system actions may be employed.

Additionally or alternatively, in some embodiments, the control system 125 may determine a status of the band 103 and control operation of the continuously moving conveyor system 101 based on the status of the band 103. More specifically, as stated, the control system 125 may monitor (e.g., continuously or periodically) the structural integrity of the band. For example, the TSC 117 may include a sensing system 123, such as a vision system (e.g., a digital camera, charge-coupled device array, etc.) or other types of sensors, adapted to detect any defects or structural problems with the band 103. The vision system may acquire one or more images of the band 103 and compare such images with previously-stored (e.g., reference images) of the band 103 to detect any defects or structural problems with the band 103. For example, by comparing images of the band 103 taken during electronic device manufacturing with reference images, the vision system may detect one or more cracks in the band 103 and/or one or more fasteners, such as rivets or the like, which may connect sections of the band 103, are loose or missing. In some embodiments, the TSC 117, periodically and/or in response to user request, may cause the vision system to acquire one or more images of the band 103. However, the TSC 117 may cause the vision system to acquire one or more images of the band 103 or other types of sensors to acquire other information about the system in a different manner. For example, the TSC 117 may cause the stress sensor and corresponding receiver to monitor the status of the band 103.

The TSC 117 may be adapted to determine the severity of detected defects or structural problems, and may control operation of the continuously moving conveyor system 101 based on the severity. For example, if the TSC 117 determines detected defects or structural problems with the belt 103 may cause a belt failure (e.g., such as the band breaking due to the defects or problems), the TSC 117 may perform an emergency stop of the belt 103. In this manner, the TSC 117 may prevent injury to personnel and/or destruction of electronic device manufacturing equipment. Further, the TSC 117 may report the event (e.g., via an error message) to a user such as an operator. Alternatively, if the TSC 117 determines detected defects or structural problems with the belt 103 may not cause a belt failure, the TSC 117 may not stop movement of the belt 103, but may report the event (e.g., via an error message) to the user such that the detected defects or structural problems may be corrected either while the belt continues to operate, or during the next scheduled stop of the belt 103 (e.g., during the next scheduled downtime of the continuously moving conveyor system 101).

Thereafter, step 211 may be performed. In step 211, the method 201 ends. Through use of the method 201, the continuously moving conveyor system 101 may improve electronic device manufacturing by reducing and/or eliminating system downtime and/or increasing system throughput. Further, the continuously moving conveyor system 101 may prevent injury to personnel and/or destruction of electronic device manufacturing equipment.

FIGS. 3-8 illustrate a second exemplary method of electronic device manufacturing in accordance with an embodiment of the present invention. With reference to FIGS. 3-8, the second exemplary method 301 of electronic device manufacturing is similar to the first exemplary method 201 of electronic device manufacturing but includes more details. With reference to FIGS. 3-8, in step 303, the second exemplary method 301 begins. In step 305, a band map that indicates an expected status of one or more positions along a band of a continuously moving conveyor system is created. Each of the one or more positions is adapted to receive a carrier support adapted to transport at least one substrate carrier around an electronic device manufacturing facility. Step 305 is similar to step 205 of the first exemplary method 201, which is described above in detail. Therefore, step 305 will not be described in detail herein.

In step 307, an actual status of a carrier support mounting position may be compared with an expected status of the carrier support mounting position. As described above, the band map may provide the expected status of the carrier support mounting position, and the TSC 117 may determine the actual status of the carrier support mounting position during electronic device manufacturing. The continuously moving conveyor system 101 may be adapted to compare the actual status with the expected status for the carrier support mounting position. In some embodiments, the continuously moving conveyor system 101 may be adapted to compare an actual status with an expected status of one or more of the one or more carrier support mounting positions. In this manner, the status of one or more carrier support mounting positions included in the continuously moving conveyor system may be monitored. If, in step 307, the actual status of the carrier support mounting position matches the expected status of the carrier support mounting position, an anomaly has not occurred during electronic device manufacturing, and therefore, step 309 is performed.

In step 309, a carrier support in a carrier support mounting position that can transfer a carrier between the band and a processing tool in the shortest time is assigned for transferring the carrier. More specifically, because, in step 307, the continuously moving conveyor system 101 determines an anomaly did not occur, the TSC 117 may assign a carrier support from a carrier support mounting position in the manner described above, thereby improving electronic device manufacturing throughput.

Thereafter, step 389 may be performed. In step 389, the method 301 ends.

Alternatively, if, in step 307, the actual status of the carrier support mounting position does not match the expected status of the carrier support mounting position, step 311 may be performed. In step 311, a request is made for a substrate loading station of the continuously moving conveyor system downstream from the carrier support mounting position to determine the actual status of the carrier support mounting position. More specifically, when the TSC 117 determines the actual status of a carrier support mounting position does not match the expected status of the carrier support mounting position, the TSC 117 may request a substrate loading station 115 (e.g., the next substrate loading station) downstream from such carrier support mounting position determines the status (e.g., actual status) of the carrier support mounting position. In response to the request from the TSC 117, the substrate loading station 115 may determine the actual status of the carrier support mounting position and report such status to the TSC 117. In this manner, the TSC 117 may verify the actual status of a carrier support mounting position.

In step 313, the actual status of the carrier support mounting position determined by the substrate loading station 115 is compared with the expected status of the carrier support mounting position. More specifically, the TSC 117 compares the actual status of the carrier support mounting position reported by the substrate loading station 115 with the expected status of the carrier support mounting position. In this manner, the TSC 117 may verify the actual status of the carrier support mounting position does not match the expected status of the carrier support mounting position. If, in step 313, the actual status of the carrier support mounting position reported by the substrate loading station 115 matches the expected status of the carrier support mounting position, the TSC 117 determines an anomaly has not occurred, and therefore, step 309 is performed.

As described above, in step 309, a carrier support in a carrier support mounting position that can transfer the substrate carrier between the band 103 and a processing tool 109 in the shortest time is assigned for transferring a carrier. In this manner, the TSC 117 may assign a carrier support from a carrier support mounting position such that electronic device manufacturing may be improved.

Alternatively, if, in step 313, the actual status of the carrier support mounting position reported by the substrate loading station 115 does not match the expected status of the carrier support mounting position, the control system 125 may determine occurrence of an anomaly during electronic device manufacturing and may control operation of the continuously moving conveyor system 101 based on the actual and expected status of the carrier support mounting position. For example, in step 315, the actual status of the carrier support mounting position is determined. As described above, in some embodiments, actual (and expected) status of the carrier support mounting position may include (1) a carrier support is not present in the position; (2) a properly-positioned carrier support, which is not supporting a substrate carrier, is present in the position; (3) a properly-positioned carrier support, which is supporting a substrate carrier, is present in the position; (4) an improperly-positioned (e.g., displaced) carrier support, which is not supporting a substrate carrier, is present in the position; and (5) an improperly-positioned carrier support, which is supporting a substrate carrier, is present in the position.

If in step 315, the actual status of the carrier support mounting position is a carrier support is not present in the carrier support mounting position, step 317 is performed. In step 317, the expected status of the carrier support mounting position is determined. If the expected status of the carrier support mounting position is a properly-positioned carrier support, which is not supporting an electronic device, is present in the position, step 319 is performed.

In step 319, the carrier support mounting position is prevented from being assigned for transferring a substrate carrier. More specifically, although a carrier support was expected to be in the carrier support mounting position, the actual status reveals that a carrier support is not present. Therefore, the TSC 117 may determine (e.g., assume) that a carrier support has become dislodged or fallen from the carrier support mounting position during electronic device manufacturing. Consequently, the TSC 117 may prevent such carrier support mounting position from being assigned for transferring a substrate carrier. A carrier support for supporting a substrate carrier may become dislodged from a carrier support mounting position on the band 103 because of (1) a failed handoff; (2) a dropped substrate carrier; or (3) an obstruction that may dislodge the carrier support and a substrate carrier supported by the carrier support. Although exemplary causes of carrier support dislodging are listed above, some embodiments may include a larger or smaller number of carrier support dislodging causes. Alternatively, some embodiments may include different carrier support dislodging causes. By preventing a carrier support mounting position, to which a carrier support is expected to be coupled but to which a carrier support is not coupled, from being assigned to transfer a substrate carrier, the TSC 117 may improve electronic device manufacturing (e.g., by reducing and/or eliminating damage caused by attempting to mount a carrier to a non-existent carrier support at a carrier support mounting position). Thereafter, step 389 may be performed in which the method 301 ends.

Alternatively, if, in step 317, the expected status of the carrier support mounting position is a properly-positioned carrier support, which is supporting a substrate carrier, is present in the position, step 321 is performed. In step 321, if a carrier support that was supposed to be in the carrier support mounting position is currently assigned to transfer a substrate carrier, the transfer is aborted at the destination substrate loading station 115. More specifically, because a carrier support that was expected to be in the carrier support mounting position is actually not present, the TSC 117 determines (e.g., assumes) the carrier support has become dislodged or fallen from the carrier support mounting position. Therefore, the TSC 117 may determine the carrier expected to be supported by the carrier support may have been dropped, and therefore, is in an unknown location. Consequently, if a carrier support that was supposed to be in the carrier support mounting position is currently assigned to transfer a carrier, the TSC 117 aborts the transfer at the destination substrate loading station 115.

In step 323, the TSC 117 may send a notification (e.g., a Transfer Complete message) to the MCS 121 that the carrier transfer failed. In this manner, the TSC 117 may notify the MCS 121 that an anomaly occurred during electronic device manufacturing which caused a transfer of a carrier between carrier support mounting position and a processing tool 109 to be aborted.

In step 325, it is determined whether an actual status of a previous carrier support mounting position that was supposed to include a properly-positioned carrier support supporting a carrier differed from an expected status of such previous carrier support mounting position in the same manner as the carrier support mounting position described above. If not, the TSC 117 may determine (e.g., assume) the band 103 is not obstructed, and therefore, no further action may be required. Consequently, step 389 is performed in which the method 301 ends. Alternatively, if, in step 325, the actual status of a previous carrier support mounting position that was supposed to include a properly-positioned carrier support supporting a carrier differs from an expected status of such previous carrier support mounting position in the same manner as the carrier support mounting position described above, the TSC may determine the band 103 is obstructed. For example, a carrier support (e.g., that is not assigned to a transfer) in the carrier support mounting position described above may have been expected to have a carrier but is now empty or missing. If this is the second such occurrence of a carrier support that is expected to have a carrier but is now empty or missing, it may be assumed that there is an obstruction that is knocking carriers from carrier supports and/or carrier supports from the band 103. The first occurrence may have been detected by the previous carrier support. More specifically, because two carrier support mounting positions each of which was expected to include a properly-positioned carrier support supporting a substrate carrier did not include carrier supports, respectively, the TSC 117 may detect (e.g., assume) an obstruction of the band 103, and therefore, step 327 is performed. In step 327, an emergency stop of the band 103 is performed. In this manner, the TSC 117 may improve electronic device manufacturing (e.g., by timely identifying and eliminating the obstruction).

Additionally, the TSC 117 may report the event (e.g., via an error message or alarm) to a user such as an operator and/or may send a notification to the MCS 121. According to some standards (e.g., SEMI E82) implemented by the TSC 117, the TSC 117 may be required to send alarms to a host (e.g., the MCS 121) that are displayed locally by the TSC 117. The MCS 121 may maintain a database of reported alarms and may forward the alarms to locations of the semiconductor device manufacturing facility.

In step 329, the carrier support mounting position is prevented from being assigned for transferring a substrate carrier. More specifically, although a carrier support was expected to be in the carrier support mounting position, the actual status reveals that a carrier support is not present. Therefore, the TSC 117 may determine (e.g., assume) that a carrier support has become dislodged or fallen from the carrier support mounting position during electronic device manufacturing. Attempting to transfer a carrier to such a carrier support mounting position is unsafe. Consequently, the TSC 117 may prevent such carrier support mounting position from being assigned for transferring a substrate carrier. Thereafter, step 389 may be performed in which the method 301 ends.

Alternatively, if, in step 317, the expected status of the carrier support mounting position is an improperly-positioned (e.g., displaced) carrier support, which is not supporting an electronic device, is present in the position, step 331 is performed. In step 331, the carrier support mounting position is continued to be prevented from being assigned for transferring a carrier. More specifically, although an improperly-positioned carrier support was expected to be coupled to the carrier support mounting position, the actual status of the carrier support mounting position reveals that a carrier support is not present. Therefore, the TSC 117 may determine (e.g., assume) that a carrier support has become dislodged or fallen from the carrier support mounting position during electronic device manufacturing. Consequently, the TSC 117 may want to prevent such position from being assigned to transfer a carrier. However, because the carrier support was expected to be displaced from the carrier support mounting position, the TSC 117 is already preventing the carrier support mounting position from being assigned to transfer a substrate carrier. A displaced carrier support is present in the carrier support mounting position and may have been properly attached to the band 103, but is no longer properly attached to the band 103. Once a carrier support becomes displaced, exchanges involving the carrier support are expected to fail. Consequently, in step 331, the TSC 117 continues to prevent the carrier support mounting position from being assigned to transfer a substrate carrier. In this manner, the displaced carrier support may be provided with maintenance and/or repaired. Thereafter, step 389 may be performed in which the method 301 ends.

Alternatively, if, in step 317, the status of the carrier support mounting position is an improperly-positioned carrier support, which is supporting a substrate carrier, is present in the position, step 331 (described above) is performed. Further, the TSC 117 may determine (e.g., assume) the carrier expected to be supported by a carrier support in the carrier support mounting position has been dropped, and therefore, is in an unknown location. Thereafter, step 389 may be performed in which the method 301 ends. In this manner, the control system 125 may control operation of the continuously moving conveyor system 101, when the actual status of a carrier support mounting position is a carrier support is not present in the position and the expected status of the carrier support mounting position is different, such that electronic device manufacturing is improved.

Alternatively, if, in step 315, the actual status of the carrier support mounting position is a properly-positioned carrier support, which is not supporting a substrate carrier, is present in the position, step 333 is performed. In step 333, the expected status of the carrier support mounting position is determined. If the expected status of the carrier support mounting position is a carrier support is not present in the position, step 335 is performed.

In step 335, the location of a predetermined starting point of the band 103 may be determined. Such process may be referred to as initiating a re-homing of the 103. For example, the TSC 117 may determine the position of a first carrier support mounting position. More specifically, re-homing of the band may refer to having the TSC 117 (e.g., an Intercept Controller of the TSC 117) search for the $0^{th}$ carrier support. The $0^{th}$ carrier support is a special "carrier support" that may identify the start of the band. Because the carrier support was not expected to be present but is now being reported as present, and because it should be physically impossible for a carrier support to appear at a previously-empty carrier support position, it is assumed that the TSC 117 may have lost count of the carrier support positions on the band. By having the TSC 117 re-home the band, the TSC 117 can insure it (e.g., the Intercept Controller included in the TSC 117) is synchronized with the band 103. More specifically, although a carrier support was not expected in the carrier support mounting position, a carrier support is actually present in the carrier support mounting position. Such occurrence is an anomaly, because a carrier support should never appear in a carrier support mounting position expected to be empty. Consequently, the TSC 117 may initiate a re-homing of the band 103, thereby insuring the TSC 117 is synchronized with the band 103.

In step 337, a new band map may be created. More specifically, after initiating the re-homing of the band, the TSC 117 may create a new band map which, as described above, may indicate a status of one or more carrier support mounting positions along the band 103 during an initialization period. Such status of the one or more carrier support mounting positions along the band 103 during the initialization period may serve as an expected status of the one or more carrier support mounting positions. The new band map may be employed to control the continuously moving conveyor system 101 during subsequent electronic device manufacturing.

Thereafter, step 389 may be performed. As stated, in step 389 the method 301 ends.

Alternatively, if, in step 333, the expected status of the carrier support mounting position is a properly-positioned carrier support, which is supporting a substrate carrier, is present in the position, step 339 may be performed. In step 339, if the carrier support in the carrier support mounting position is currently assigned to transfer a substrate carrier, the transfer is aborted at the destination substrate loading station 115. More specifically, because a carrier that was expected to be supported by the carrier support in the carrier support mounting position is actually not present, the TSC 117 determines (e.g., assumes) the carrier has been dropped, and therefore, is in an unknown location. A carrier may have been dropped due to a failed exchange (e.g., handoff) at a substrate loading station 115. Alternatively, the carrier may have been dropped due to an exchange at a substrate loading station 115 in which a carrier was not properly attached to a carrier support, and therefore, was dropped at some point after the carrier support exits the substrate loading station 115. More specifically, in the latter case, the substrate loading station 115 at which the exchange occurred will have reported that the transfer was successful and that the carrier is attached to the carrier support. However, at some point prior to the carrier support reaching the destination substrate loading station 115, the carrier is dropped from the carrier support. Alternatively, an obstruction of the band may dislodges carriers from carrier supports and cause such carriers to drop. If an obstruction is not removed, the obstruction may dislodge multiple carriers. Therefore, it is important for the TSC 117 detect this anomaly as soon as possible. Without a carrier, the carrier support in the carrier support mounting position may not successfully complete a transfer of the carrier between the band 103 and the processing tool 109. Consequently, if the carrier support in the carrier support mounting position is currently assigned to transfer a carrier, the transfer is aborted at the destination substrate loading station 115.

In step 341, the TSC 117 may send a notification (e.g., a Transfer Complete message) to the MCS 121 that the carrier transfer failed. In this manner, the TSC 117 may notify the MCS 121 that an anomaly occurred during electronic device manufacturing which caused a transfer of the carrier between the carrier support mounting position and a processing tool 109 to be aborted.

In step 343, it is determined whether an actual status of a previous carrier support mounting position that was supposed to include a carrier support supporting a carrier differs from an expected status of such previous carrier support mounting position in the same manner as the carrier support mounting position described above. If not, step 389 is performed in which the method 301 ends. Alternatively, if, in step 343, the actual status of the previous carrier support mounting position that was supposed to include a carrier support supporting a carrier differs from the expected status of such previous carrier support mounting position in the same manner as the carrier support mounting position described above, step 345 is performed. In step 345, an emergency stop of the band is performed. More specifically, because two carrier support mounting positions each of which was expected to include a carrier support supporting a substrate carrier actually included carrier supports which did not support carriers, respectively, the TSC 117 may detect (e.g., assume) an obstruction of the band 103, and therefore, perform an emergency stop of the band 103. In this manner, the TSC 117 may improve electronic device manufacturing (e.g., by preventing an obstruction from causing injury to personnel and/or destruction of electronic device manufacturing equipment). Additionally, the TSC 117 may report the event (e.g., via an error message or alarm) to the user and/or may send a notification to the MCS 121.

In step 347, the carrier support mounting position is prevented from being assigned for transferring a substrate carrier. More specifically, although a carrier support supporting a carrier was expected to be in the carrier support mounting position, the actual status reveals that a carrier support, which is not supporting the carrier, is present. Therefore, the TSC 117 may determine (e.g., assume) that the carrier has been dropped during electronic device manufacturing, and therefore is in an unknown location. Consequently, the TSC 117 may prevent such carrier support mounting position from being assigned for transferring a substrate carrier (e.g., until a user investigates the cause of the anomaly further). Thereafter, step 389 may be performed in which the method 301 ends.

Alternatively, if, in step 333, the expected status of the carrier support mounting position is an improperly-positioned (e.g., displaced) carrier support, which is not supporting a substrate carrier, is present in the position, step 349 is performed. In step 349, the carrier support mounting position is assigned for transferring a carrier between the band 103 and a substrate loading station 115. More specifically, the carrier support in the carrier support mounting position was expected to be improperly-positioned. However, the actual status of the carrier support mounting position indicates that the carrier support is properly positioned (e.g., not displaced). Therefore, such carrier support may be employed to transfer a carrier between the band 103 and a processing tool 109. Consequently, the TSC 117 may be allowed to assign the carrier support for a transfer. In this manner, the control system 125 of the continuously moving conveyor system 101 may take advantage of the occurrence of a favorable anomaly such that electronic device manufacturing may be improved (e.g., electronic device manufacturing throughput increases). Thereafter, step 389 may be performed in which the method 301 ends.

Alternatively, if, in step 333, the expected status of the carrier support mounting position is an improperly-positioned carrier support, which is supporting a substrate carrier, is present in the position, step 349 (described above) is performed. Further, the TSC 117 may determine (e.g., assume) the carrier expected to be supported by the carrier support in the carrier support mounting position has been dropped, and therefore, is in an unknown location. Thereafter, step 389 may be performed in which the method 301 ends. In this manner, the control system 125 may control operation of the continuously moving conveyor system 101, when the actual status of a carrier support mounting position is a properly-positioned carrier support, which is not supporting a substrate carrier, is present in the position and the expected status of the carrier support mounting position is different, such that electronic device manufacturing is improved.

Alternatively, if, in step 315, the actual status of the carrier support mounting position is a properly-positioned carrier support, which is supporting a substrate carrier, is present in the position, step 351 is performed. In step 351, the expected status of the carrier support mounting position is determined.

If the expected status of the carrier support mounting position is a carrier support is not present in the position, step 353 is performed. In step 353, similar to step 335, the location of a predetermined starting point of the band 103 may be determined (e.g., a re-homing may be initiated). More specifically, although a carrier support was not expected in the carrier support mounting position, a carrier support is actually present in the carrier support mounting position. Such occurrence is an anomaly, because a carrier support should not appear in a carrier support mounting position expected to be empty. Consequently, the TSC 117 may initiate a re-homing of the ribbon or band 103, thereby insuring the TSC 117 is synchronized with the band 103.

In step 355, similar to step 337 (described above), a new band map may be created. Thereafter, step 389 may be performed. As stated, in step 389 the method 301 ends.

Alternatively, if, in step 351, the expected status of the carrier support mounting position is a properly-positioned carrier support, which is not supporting a substrate carrier, is present in the position, or the expected status of the carrier support mounting position is an improperly-positioned (e.g., displaced) carrier support, which is not supporting a substrate, is present in the position, step 353 is performed. More specifically, although the carrier support in the carrier support mounting position was not expected to support a carrier, the actual status indicates the carrier support in the carrier support mounting position is supporting a carrier. Such occurrence is an anomaly, because a carrier should not appear in a carrier support expected to be empty. Consequently, the TSC 117 may initiate a re-homing of the ribbon or band 103, thereby insuring the TSC 117 is synchronized with the band 103. Thereafter, step 355 in which a new band map may be created, and step 389 in which the method 301 ends are performed.

Alternatively, if, in step 351, the expected status of the carrier support mounting position is an improperly-positioned carrier support, which is supporting a substrate carrier, is present in the position, step 356 is performed. In step 356, if a command to transfer a substrate carrier from a carrier support in the carrier support mounting position is received, the carrier is transferred between the band 103 and a substrate loading station 115. More specifically, the carrier support in the carrier support mounting position was expected to be improperly-positioned, and therefore, such carrier support mounting position may have been prevented from being assigned to a transfer (e.g., for safety reasons and/or because transfers using improperly-positioned carrier supports are expected to fail). However, although the carrier support mounting position may previously have been improper, the actual status of the carrier support mounting position indicates that the carrier support is now properly positioned (e.g., not displaced), and therefore, may no longer pose a safety risk. Consequently, if the TSC 117 receives a command to transfer the carrier from the carrier support in the carrier support mounting position (e.g., from the MCS 121), the TSC 117 may initiate the transfer of the carrier between the band 103 and a substrate loading station 115. In this manner, the control system 125 of the continuously moving conveyor system 101 may take advantage of the occurrence of a favorable anomaly such that electronic device manufacturing may be improved (e.g., such that electronic device manufacturing throughput increases. Thereafter, step 389 may be performed in which the method 301 ends. In this manner, the control system 125 may control operation of the continuously moving conveyor system 101, when the actual status of a carrier support mounting position is a properly-positioned carrier support, which is supporting a substrate carrier, is present in the position and the expected status of the carrier support mounting position is different, such that electronic device manufacturing is improved.

Alternatively, if, in step 315, the actual status of the carrier support mounting position is an improperly-positioned (e.g., displaced) carrier support, which is not supporting a substrate carrier, is present in the position, step 357 is performed. In step 357, the expected status of the carrier support mounting position is determined.

If the expected status of the carrier support mounting position is a carrier support is not present in the position, step 359 is performed. In step 359, similar to step 353 (described above), the location of a predetermined starting point of the band 103 may be determined (e.g., a re-homing may be initiated). In step 361, similar to step 355 (described above), a new band map may be created. Thereafter, step 389 may be performed. As stated, in step 389 the method 301 ends.

Alternatively, if, in step 357, the expected status of the carrier support mounting position is a properly-positioned carrier support, which is not supporting a substrate carrier, is present in the position, step 363 is performed. In step 363, the carrier support mounting position is prevented from being assigned for transferring a carrier. More specifically, although a properly-positioned carrier support was expected to be in the carrier support mounting position, the actual status reveals that an improperly-positioned (e.g., displaced) carrier support is present, which is an anomaly. Because the carrier support is improperly positioned, using such carrier support from the carrier support mounting position poses a potential risk. Consequently, to avoid possible injury and/or destruction of electronic device manufacturing equipment, the TSC 117 may prevent such carrier support mounting position from being assigned for transferring a substrate carrier (e.g., until a user may further investigate the occurrence of the anomaly). Thereafter, step 389 may be performed in which the method 301 ends.

Alternatively, if, in step 357, the expected status of the carrier support mounting position is a properly-positioned carrier support, which is supporting a substrate carrier, is present in the position, step 365 is performed. In step 365, if a carrier support in the carrier support mounting position is currently assigned to transfer a substrate carrier, the transfer is aborted at the destination substrate loading station 115. More specifically, because a carrier that was expected to be supported by the carrier support in the carrier support mounting position is actually not present, the TSC 117 determines (e.g., assumes) the carrier has been dropped, and therefore, is in an unknown location. Without a carrier, the carrier support in the carrier support mounting position may not successfully complete a transfer of a carrier between the band 103 and the processing tool 109. Consequently, if the carrier support in the carrier support mounting position is currently assigned to transfer a carrier, the transfer is aborted at the destination substrate loading station 115.

In step 367, the TSC 117 may send a notification (e.g., a Transfer Complete message) to the MCS 121 that the carrier transfer failed. In this manner, the TSC 117 may notify the MCS 121 that an anomaly occurred during electronic device manufacturing which caused a transfer of a carrier between the carrier support mounting position and a processing tool 109 to be aborted.

In step 369, it is determined whether an actual status of a previous carrier support mounting position that was supposed to include a carrier support supporting a carrier differs from an expected status of such previous carrier support mounting position in the same manner as the carrier support mounting position described above. If not, step 389 is performed in which the method 301 ends. Alternatively, if, in step 369, the actual status of the previous carrier support mounting position that was supposed to include a carrier support supporting a carrier differs from the expected status of such previous carrier support mounting position in the same manner as the carrier support mounting position described above, step 371 is performed. In step 371, an emergency stop of the band is performed. More specifically, because two carrier support mounting positions each of which was expected to include a carrier support supporting a carrier included carrier supports which did not actual support carriers, respectively, the TSC 117 may detect (e.g., assume) an obstruction of the band 103, and therefore, perform an emergency stop of the band 103. In this manner, the TSC 117 may improve electronic device manufacturing (e.g., by preventing the obstruction from causing injury and/or destruction of electronic device manufacturing equipment). Additionally, the TSC 117 may report the event (e.g., via an error message or alarm) to a user such as an operator and/or may send a notification to the MCS 121.

In step 373, the carrier support mounting position is prevented from being assigned for transferring a substrate carrier. More specifically, although a properly-positioned carrier support supporting a substrate carrier was expected to be in the carrier support mounting position, the actual status reveals that an improperly-positioned (e.g., displaced) carrier support, which is not supporting a substrate carrier, is present. Thus, an anomaly has occurred. Therefore, the TSC 117 may determine (e.g., assume) that the carrier has been dropped during electronic device manufacturing, and therefore is in an unknown location. Further, because the carrier support is improperly positioned, using such carrier support from the carrier support mounting position is undesirable. Consequently, the TSC 117 may prevent such carrier support mounting position from being assigned for transferring a substrate carrier (e.g., until a user further investigates the anomaly). Thereafter, step 389 may be performed in which the method 301 ends.

Alternatively, if, in step 357, the expected status of the carrier support mounting position is an improperly-positioned carrier support, which is supporting a substrate carrier, is present in the position, step 375 is performed. In step 375, the carrier support mounting position is continued to be prevented from being assigned for transferring a carrier. More specifically, although an improperly-positioned carrier support supporting a carrier was expected to be in the carrier support mounting position, the actual status reveals that an improperly-positioned carrier support, which is not supporting a substrate carrier, is present in the position. Therefore, the TSC 117 may determine (e.g., assume) that the carrier has been dropped during electronic device manufacturing, and therefore is in an unknown location. Consequently, the TSC 117 may want to prevent such carrier support mounting position from being assigned for transferring a substrate carrier (e.g., until a user may further investigate why the carrier was dropped). However, because the carrier support is expected to be displaced from the carrier support mounting position, because of the risks of using a displaced carrier support from the carrier support mounting position to support a carrier, the TSC 117 is already preventing the carrier support mounting position from being assigned to transfer an substrate carrier. Consequently, in step 375, the TSC 117 may continue to prevent the carrier support mounting position from being assigned for transferring a carrier. Thereafter, step 389 may be performed in which the method 301 ends. In this manner, the control system 125 may control operation of the continuously moving conveyor system 101, when the actual status of a carrier support mounting position is an improperly-positioned (e.g., displaced) carrier support, which is not supporting a substrate, is present in the position and the expected status of the carrier support mounting position is different, such that electronic device manufacturing is improved.

Alternatively, if, in step 315, the actual status of the carrier support mounting position is an improperly-positioned carrier support, which is supporting a substrate carrier, is present in the position, step 377 is performed. In step 377, the expected status of the carrier support mounting position is determined.

If the expected status of the carrier support mounting position is a carrier support is not present in the position, step 379 is performed. In step 379, similar to step 353, the location of a predetermined starting point of the band 103 may be determined (e.g., a re-homing may be initiated). More specifically, although a carrier support was not expected in the carrier support mounting position, an improperly-positioned carrier support is actually present in the position. Such occurrence is an anomaly, because a carrier support should not appear in a carrier support mounting position that is expected to be empty. Consequently, the TSC 117 may initiate a re-homing of the band 103.

In step 381, similar to step 355 (described above), a new band map may be created. Thereafter, step 389 may be performed. As stated, in step 389 the method 301 ends.

Alternatively, if, in step 377, the expected status of the carrier support mounting position is a properly-positioned carrier support, which is not supporting a substrate carrier, is present in the position, or the expected status of the carrier support mounting position is an improperly-positioned (e.g., displaced) carrier support, which is not supporting a substrate carrier, is present in the position, step 379 is performed. More specifically, although the carrier support in the carrier support mounting position was not expected to support a carrier, the actual status indicates the carrier support in the carrier support mounting position is supporting a carrier. Such occurrence is an anomaly, because a carrier should not appear in a carrier support that is expected to be empty. Consequently, the TSC 117 may initiate a re-homing of the band 103. Thereafter, step 381 in which a new band map may be created, and step 389 in which the method 301 ends are performed. In this manner, the control system 125 may control operation of the continuously moving conveyor system 101 when the actual status of a carrier support mounting position indicates a carrier support in the position is supporting a carrier and carrier support was not expected to support a carrier such that electronic device manufacturing is improved.

Alternatively, if, in step 377, the expected status of the carrier support mounting position is a properly-positioned carrier support, which is supporting a substrate carrier, is present in the position, step 383 is performed. In step 383, if a carrier support in the carrier support mounting position is currently assigned to transfer a carrier, the transfer is aborted at the destination substrate loading station 115. More specifically, although the carrier support was expected to be properly positioned in the position, the actual status of the carrier support mounting position indicates the carrier support is improperly-positioned (e.g., displaced) in the carrier support mounting position. Because the carrier support improperly-positioned, using such carrier support from the position to transfer a carrier may result in dropping of the carrier, and therefore, is undesirable. Operator intervention may be required to remove such carrier from the improperly-positioned carrier support. Consequently, if the carrier support in the carrier support mounting position is currently assigned to transfer a carrier, the TSC 117 may abort the transfer at the destination substrate loading station 115, thereby preventing injury and/or destruction of electronic device manufacturing equipment.

In step 385, the TSC 117 may send a notification (e.g., a Transfer Complete message) to the MCS 121 that the carrier transfer failed. In this manner, the TSC 117 may notify the MCS 121 that an anomaly occurred during electronic device manufacturing which caused a transfer of a carrier between carrier support mounting position and a processing tool 109 to be aborted.

In step 387, the carrier support mounting position is prevented from being assigned for transferring a substrate carrier. More specifically, although a properly-positioned carrier support supporting a substrate carrier was expected to be in the carrier support mounting position, the actual status reveals that an improperly-positioned carrier support, which is supporting a substrate carrier, is present in the carrier support mounting position. Consequently, due to the safety considerations described above, the TSC 117 may prevent such carrier support mounting position from being assigned for transferring a carrier. Thereafter, step 389 may be performed in which the method 301 ends. In this manner, the control system 125 may control operation of the continuously moving conveyor system 101, when the actual status of a carrier support mounting position is an improperly-positioned carrier support, which is supporting a substrate carrier, is present in the position and the expected status of the carrier support mounting position is different, such that electronic device manufacturing is improved.

Additionally or alternatively, in some embodiments, during the second exemplary method 301, the control system 125 may determine a status of the band 103 and control operation of the continuously moving conveyor system 101 based on the status of the band 103 in a manner similar to that described for the first exemplary method 201. In this manner, the control system 125 of a continuously moving conveyor system 101 may monitor the status of one or more positions of a band 103 adapted to receive a carrier support that may support a carrier and/or monitor the status of the band 103, and control operation of the conveyor system 101 based on the monitoring such that electronic device manufacturing is improved.

The foregoing description discloses only exemplary embodiments of the invention. Modifications of the above disclosed apparatus and methods which fall within the scope of the invention will be readily apparent to those of ordinary skill in the art. For instance, it will be understood that the invention also may be employed with any type of substrates such as a silicon substrate, a glass plate, a mask, a reticule, a wafer, etc., whether patterned or unpatterned; and/or with apparatus for transporting and/or processing such substrates. In some embodiments above, after the TSC 117 aborts a transfer at a destination substrate loading station 115 and sends a notification to the MCS 121 that the carrier transfer failed, it is determined whether an actual status of a previous carrier support mounting position that was supposed to include a carrier support supporting a carrier differed from an expected status of such previous carrier support mounting position in the same manner as the carrier support mounting position described above. However, in other embodiments, after the TSC 117 aborts the transfer of a first carrier and sends such notification, the TSC 117 may request the status of the next carrier support mounting position expected to arrive with a carrier at the destination substrate loading station 115. More specifically, the transfer of the carrier may have failed at a substrate loading station 115 and the location of the carrier may be unknown. The failed transfer may result in the carrier causing an obstruction at the substrate loading station 115 where the transfer failed. Therefore, such obstruction may remove the carrier from the next carrier support that arrives at the substrate loading station 115. Consequently, the next carrier support may be evaluated on exit from the substrate loading station 115 or by the first downstream substrate loading station 115. In such embodiments, if the destination substrate loading station 115 reports that on exit from the substrate loading station 115 the carrier support was not supporting a carrier, the TSC 117 may assume transfer failure of the previous carrier created an obstruction, and may (1) perform an emergency stop of the band; (2) send an alarm notification to the MCS 121; and/or (3) report the event (e.g., via an error message) to a user such as an operator. Further, although the TSC 117, MSC 115 and substrate loading station software 119a-f of the control system 125 are shown as separate components, in some embodiments, one or more such components may be integrated. One or more components of the control system 125 may execute, include, or be a computer program product carried by a medium readable by a computer (e.g., a carrier wave signal, a floppy disc, a compact disc, a DVD, a hard drive, a random access memory, etc.).

As stated, the TSC 117 may be adapted to monitor band status. In some embodiments, band status may include, for example, one or more of a status of carrier support mounting positions on the band 103, a status of band motors and/or drives, and/or a status of the band itself (e.g., a status of the structural integrity of the band). In some embodiments, the TSC 117 may be responsible for interfacing with the MCS 121, substrate loading stations 115, and transfer stations to perform intra-bay and inter-bay carrier (or cassette) transfers, controlling the velocity of the band, allocating carrier supports on the band for transporting carriers, monitoring the status of the carrier supports on the band, and/or monitoring the status of band motors and/or drives.

Accordingly, while the present invention has been disclosed in connection with exemplary embodiments thereof, it should be understood that other embodiments may fall within the spirit and scope of the invention, as defined by the following claims.

The invention claimed is:

1. A computer program product, comprising:
   a medium readable by a computer, the computer readable medium having computer program code adapted to:
   create a band map that indicates an expected status of one or more positions along a band of a continuously moving conveyor system, each position adapted to receive a carrier support adapted to transport at least one substrate carrier around an electronic device manufacturing facility;
   monitor status of the one or more positions included in the continuously moving conveyor system; and
   control operation of the continuously moving conveyor system based on the status the one or more positions.

2. The computer program product of claim 1 wherein the computer program code is further adapted to:
   monitor status of the band; and
   control operation of the continuously moving conveyor system based on the status of the band.

3. The computer program product of claim 2 wherein the computer program code is further adapted to:
   monitor the structural integrity of the band; and
   control operation of the continuously moving conveyor system based on the structural integrity of the band.

4. The computer program product of claim 1 wherein the computer program code is further adapted to compare an expected status of a position on the band with an actual status of the position.

5. The computer program product of claim 1 wherein the computer program code is further adapted to:
   determine an occurrence of an anomaly in the continuously moving conveyor system; and
   at least one of:
      prevent a position from being assigned for transferring a substrate carrier;
      cause a transfer at a processing tool to be aborted;
      cause the band to stop moving;
      determine the location of a predetermined starting point of the band and create a new band map;
      assign a position for transferring a substrate carrier between the band and the processing tool; and
      cause a transfer of a substrate carrier between the band and the processing tool.

6. The computer program product of claim 1 wherein the computer program code is further adapted to:
   detect a problem with structural integrity of the band; and
   cause the band to stop moving if a problem with structural integrity of the band is detected.

7. The computer program product of claim 1 wherein the computer program code is further adapted to:
   at least one of:
      monitor a speed at which the band moves;
      control the speed at which the band moves;
      monitor status of the structural integrity of the band;
      monitor status of one or more carrier supports coupled to the band;
      allocate a carrier support for supporting a substrate carrier; and
      provide to a substrate loading station of a processing tool adapted to transfer a substrate carrier between the band and the processing tool, at least one of the speed at which the band moves, the status of the structural integrity of the band and the status of the one or more carrier supports coupled to the band; and
      control the processing tool such that the substrate loading station transfers an substrate carrier between the band and the processing tool.

8. The computer program product of claim 7 wherein the computer program code is further adapted to:
   create the band map that indicates an expected status of all positions on the band that are adapted to receive a carrier support;
   monitor status of the one or more positions included in the continuously moving conveyor system;
   control operation of the continuously moving conveyor system based on the status of the one or more positions; and
   communicate with a transport system controller and substrate loading station of the processing tool such that a substrate carrier is transferred between the band and the processing tool.

9. A method of electronic device manufacturing, comprising:
   creating a band map that indicates an expected status of one or more positions along a band of a continuously moving conveyor system, each position adapted to receive a carrier support adapted to transport at least one substrate carrier around an electronic device manufacturing facility;
   monitoring status of the one or more positions included in the continuously moving conveyor system; and
   controlling operation of the continuously moving conveyor system based on the status the one or more positions.

10. The method of claim 9 further comprising:
    monitoring status of the band; and
    controlling operation of the continuously moving conveyor system based on the status of the band.

11. The method of claim 10 further comprising:
    monitoring the structural integrity of the band; and
    controlling operation of the continuously moving conveyor system based on the structural integrity of the band.

12. The method of claim 9 further comprising comparing an expected status of a position on the band with an actual status of the position.

13. The method of claim 9 further comprising:
    determining an occurrence of an anomaly in the continuously moving conveyor system; and
    at least one of:
       preventing a position from being assigned for transferring a substrate carrier;
       causing a transfer at a processing tool to be aborted;
       causing the band to stop moving;
       determining the location of a predetermined starting point of the band and creating a new band map;
       assigning a position for transferring a substrate carrier between the band and a processing tool; and
       causing transfer of a substrate carrier between the band and the processing tool.

14. The method of claim 9 further comprising:
    detecting a problem with structural integrity of the band; and
    causing the band to stop moving if a problem with structural integrity of the band is detected.

15. The method of claim 9 further comprising:
    at least one of:
       monitoring a speed at which the band moves;
       controlling the speed at which the band moves;
       monitoring status of the structural integrity of the band;

monitoring status of one or more carrier supports coupled to the band;

allocating a carrier support for supporting a substrate carrier; and providing to a substrate loading station of a processing tool adapted to transfer a substrate carrier between the band and the processing tool, at least one of the speed at which the band moves, the status of the structural integrity of the band and the status of the one or more carrier supports coupled to the band; and controlling the processing tool such that the substrate loading station transfers a substrate carrier between the band and the processing tool.

16. The method of claim 15 further comprising controlling the processing tool using software such that the substrate loading station transfers a substrate carrier between the band and the processing tool.

17. The method of claim 9 further comprising creating the band map that indicates an expected status of all positions on the band that are adapted to receive carrier support;

monitoring status of the one or more positions included in the continuously moving conveyor system;

controlling operation of the continuously moving conveyor system based on the status of the one or more positions; and communicating with a transport system controller of the continuously moving conveyor system and substrate loading station of the processing tool such that a substrate carrier is transferred between the band and the processing tool.

18. A system for electronic device manufacturing, comprising:

a continuously moving conveyor system, including a band having one or more positions adapted to receive a respective carrier support adapted to support a substrate carrier and transport the substrate carrier around an electronic device manufacturing facility;

at least one processing tool; and a control system, coupled to the continuously moving conveyor system and the at least one processing tool, adapted to:

create a band map that indicates an expected status of the one or more positions adapted to receive a carrier support along the band;

monitor status of the one or more positions included in the continuously moving conveyor system; and control operation of the continuously moving conveyor system based on the status of the one or more positions.

19. The system of claim 18 wherein the control system is further adapted to:

monitor status of the band; and control operation of the continuously moving conveyor system based on the status of the band.

20. The system of claim 19 wherein the control system is further adapted to:

monitor the structural integrity of the band; and control operation of the continuously moving conveyor system based on the structural integrity of the band.

21. The system of claim 18 wherein the control system is further adapted to compare an expected status of a position on the band with an actual status of the position.

22. The system of claim 18 wherein the control system is further adapted to:

determine an occurrence of an anomaly; and at least one of:

prevent a position from being assigned for transferring a substrate carrier;

cause a transfer at one of the at least one processing tool to be aborted;

cause the band to stop moving;

determine the location of a predetermined starting point of the band and create a new band map;

assign a position for transferring a substrate carrier between the band and one of the at least one processing tool; and cause a substrate carrier to be transferred between the band and one of the at least one processing tool.

23. The system of claim 18 wherein the control system includes a sensing system adapted to detect a problem with structural integrity of the band; and wherein the control system is further adapted to cause the band to stop moving if a problem with structural integrity of the band is detected.

24. The system of claim 18 wherein the continuously moving conveyor system comprises:

a transport system controller adapted to at least one of:

monitor a speed at which the band moves;

control the speed at which the band moves;

monitor status of the structural integrity of the band;

monitor status of one or more carrier supports coupled to the band;

allocate a carrier support for supporting a substrate carrier; and provide to a respective substrate loading station of at least one processing tool adapted to transfer a substrate carrier between the band and the processing tool, at least one of the speed at which the band moves, the status of the structural integrity of the band and the status of the one or more carrier supports coupled to the band; and wherein the substrate loading station of each of the at least one processing tool is adapted to control the processing tool such that the substrate loading station transfers a substrate carrier between the band and the processing tool.

25. The system of claim 24 wherein the substrate loading station of each of the at least one processing tool is adapted to control the processing tool using software such that the substrate loading station transfers a substrate carrier between the band and the processing tool, wherein the control system includes a transport system controller adapted to:

create the band map that indicates an expected status of the one or more positions on the band that are adapted to receive carrier support, monitor status of the one or more positions included in the continuously moving conveyor system, and control operation of the continuously moving conveyor system based on the status of the one or more positions, and the control system further includes a host control system adapted to communicate with the transport system controller and substrate loading station software of the at least one processing tool such that a substrate carrier is transferred between the band and a processing tool.

* * * * *